US007507157B2

(12) United States Patent
Vale et al.

(10) Patent No.: US 7,507,157 B2
(45) Date of Patent: Mar. 24, 2009

(54) PERIPHERAL INFORMATION AND DIGITAL TELLS IN ELECTRONIC GAMES

(75) Inventors: Peter O. Vale, Seattle, WA (US); Joshua Howard, Redmond, WA (US); Jason W. Mai, Seattle, WA (US); Richard Thames Rowan, Redmond, WA (US); Brett Allan Roark, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/182,630

(22) Filed: Jul. 14, 2005

(65) Prior Publication Data

US 2007/0015574 A1 Jan. 18, 2007

(51) Int. Cl.
*G06F 17/00* (2006.01)
*G06F 19/00* (2006.01)

(52) U.S. Cl. .............................. 463/30; 463/9; 463/10; 463/11; 463/42; 434/236

(58) Field of Classification Search .................... 463/1, 463/9, 13, 23, 30–34, 37, 40, 42, 10, 11
See application file for complete search history.

(56) References Cited

U.S. PATENT DOCUMENTS

| | | | | |
|---|---|---|---|---|
| 5,498,003 | A * | 3/1996 | Gechter | 463/31 |
| 5,618,045 | A * | 4/1997 | Kagan et al. | 463/40 |
| 5,807,174 | A * | 9/1998 | Fukuhara et al. | 463/31 |
| 6,290,602 | B1 * | 9/2001 | Kawano | 463/23 |
| 6,306,039 | B1 * | 10/2001 | Kaji et al. | 463/42 |
| 6,699,043 | B2 * | 3/2004 | Ho et al. | 434/236 |
| 6,951,516 | B1 * | 10/2005 | Eguchi et al. | 463/40 |
| 7,128,651 | B2 * | 10/2006 | Miyamoto et al. | 463/35 |
| 7,306,521 | B2 * | 12/2007 | Toyoda | 463/20 |
| 7,410,418 | B2 * | 8/2008 | Potter | 463/14 |
| 2002/0132655 | A1 * | 9/2002 | Mercer et al. | 463/1 |
| 2003/0199316 | A1 * | 10/2003 | Miyamoto et al. | 463/35 |
| 2004/0009813 | A1 * | 1/2004 | Wind | 463/30 |
| 2004/0087355 | A1 * | 5/2004 | Toyoda | 463/16 |
| 2004/0143852 | A1 * | 7/2004 | Meyers | 725/133 |
| 2004/0153557 | A1 * | 8/2004 | Shochet et al. | 709/229 |
| 2005/0202867 | A1 * | 9/2005 | Cok | 463/30 |
| 2006/0025191 | A1 * | 2/2006 | Snow et al. | 463/13 |
| 2006/0154711 | A1 * | 7/2006 | Ellis et al. | 463/1 |
| 2007/0173321 | A1 * | 7/2007 | Shen et al. | 463/40 |

* cited by examiner

*Primary Examiner*—John M Hotaling
*Assistant Examiner*—Milap Shah
(74) *Attorney, Agent, or Firm*—Workman Nydegger

(57) ABSTRACT

An indication of actions by participants taking part in an interactive environment that can represent peripheral information or tells (i.e., not essential to participating in the environment) are communicated to computing devices used by other participants in the interactive environment. Each such action or behavior being monitored is associated with a corresponding indicator. After one of the additional behaviors is detected, the corresponding indicator can be presented to another participant by a computing device used by the other participant. Thus, the other participant may perceive, and respond to the peripheral behavior. For example, if the interactive environment is a card game, a player's act in reordering cards that are held, counting chips, moving the input device in a spurious manner, and other such behaviors are indicated to other players. Receiving indicators of these behaviors enables other players to respond to these behaviors, making the interactive environment more like playing face-to-face.

21 Claims, 20 Drawing Sheets

PERIPHERAL INFORMATION AND DIGITAL TELLS IN ELECTRONIC GAMES

BACKGROUND

Computing systems have become increasingly important not just for business applications, but for recreational purposes as well. Millions use computing systems including desktop and portable personal computers, handheld computers, video gaming systems, portable video gaming systems, and suitably equipped personal communications systems, for playing computer games, instant messaging, video conferencing, and countless other similar applications. For computer games and messaging alone, such devices have become indispensable to countless individuals.

One example of an increasingly popular computer game is online poker, which is perhaps due to the popularity of televised poker tournaments and the burgeoning interest in poker, generally. In an online poker game, players can interact with other players in real time, and in some games, can even wager and collect real money. Players interested in playing poker can typically readily find a game over the Internet, even if they do not personally know others who want to play. Furthermore, players who wish to play anonymously, without exposing their identities to other players, can protect their privacy as they wish. However, while playing poker online offers some advantages, it also presents disadvantages. Experienced poker players do more than consider their own hands, watch what cards that their opponents play, and monitor the level of the current bet. Good players also watch other players to see how they manipulate their cards, and how attentive to the other players they are. Further, they may study other players for “tells,” such as mannerisms and gestures that seem to indicate when a player has good cards or might be bluffing.

Current online poker games, however, do not communicate these additional types of behavior to other players. As a result, some of the subtler aspects of the game—and some of the enjoyment of the game—is lost.

FIG. 1A illustrates the operation of a typical on-line poker game as it may currently be played. More specifically, FIG. 1A shows a game screen 100*a* presented on a computer display 102. Game screen 100*a* illustrates a round of unique game that uses some of the principles of conventional poker, referred to as “seven-hand poker.” In seven-hand poker, one participant selects a card to be played, while an opposing participant chooses in which of seven hands—represented by seven chips 104—in which the card will be played. At the end of the round, cards played are turned face up, and the player with the better hand for each of the seven chips 104 wins that chip. To play the game, a player uses his or her hand 106 to a move a mouse 108 to control a cursor 110*a*. Movements 112 of cursor 110*a* correspond with movements 114 of mouse 108. Upon selecting a displayed object, such as one of a number of playing cards 116*a* or a submit button 118, by pressing one or more mouse buttons 120, the player takes his or her turn.

FIGS. 1B through 1D show the kinds of actions a player might perform in a typical game of this type before playing a card that might be of interest to an astute opponent. As compared to FIG. 1A, FIG. 1B shows a game screen 100*b* where the player has used a cursor 100*b* to rearrange cards 116*b* in the player's hand, so as to group cards of equal rank into pairs. Having rearranged cards 116*b* on game screen 100*b*, as shown in FIG. 1C on a game screen 100*c*, the player then may control a cursor 100*c* to choose a card 122 for possible play. However, assuming that the player is at least somewhat disinterested in the game or cannot decide, the player opens a browser window 124, as shown in FIG. 1D, instead of taking his/her turn. Alternatively, the player may simply stop interacting in the game for at least a predefined time, e.g., sufficiently long to enable a screen saver to run. After that, as shown by a game screen 100*e* of FIG. 1E, the player, apparently having changed his/her mind, chooses to play a card 126 and controls a cursor 100*e* to click on submit, to complete his/her turn.

These machinations by the player, however, are not revealed or evident to other players. FIG. 1F shows a game screen 100*f* that might be viewed by an opponent while the other player has rearranged his cards (as illustrated in FIG. 1B), temporarily chosen one card to play (as shown in FIG. 1C), and surfed the web (as illustrated in FIG. 1D). The only variance discernible by the opponent occurs when, as shown in FIG. 1E, the player finally decides to play card 126. At that point, as shown in FIG. 1G, that card suddenly appears face down on a game screen 100*g*, and a place prompt 128 appears, prompting the opponent to position the card played by the player. Thus, whatever information that the opponent might have gleaned from the player's actions if they had been sitting face-to-face, or whatever “bluffing” the player might have intended through these actions, is lost within the computerized poker game, because it will not be evident to the other players in the game.

Other online games and environments also fail to communicate such behaviors, so that the information corresponding to actions by a player is not evident to the other participants in the online game or environment. For example, in online messaging, a participant in a session may not be aware of whether the sender is distracted by other windows or received a chat message from another person, has edited and revised a message to indicate that the writer is being careful with their words, or other such factors that would be evident if the parties chatting were present in the same room. Similarly, despite the growing importance of online commerce, such as online auctions, the only behaviors of participants that may be monitored are the bids they make. Although the behavior and demeanor of other participants in a bidding process may be of tremendous interest to other bidders—as it is at real auctions—this information is not available in online auctions.

Clearly, participants in interactive computing environments or games would often want to be able to perceive the behaviors and related information for other participants, beyond those behaviors mandated by the interactive environment to complete a turn or a move. Currently, that type of information is not provided in online games or in many other types of interactive environments that occur online.

SUMMARY

To substantially enhance the experience of participants in an interactive computing environment, such as a game, information is provided about actions of other participants, beyond the minimum information necessary to convey actions those players have taken as mandated by the game or during some other form of interaction. For example, in an online poker game, when a player reorders his or her cards, select a card to play and then changes his or her mind, counts his or her chips, etc., this information can be provided to other players by visual or audible indicators. Thus, other players can assess any peripheral information or tells that they might gather from the first player's behavior when making their own moves or formulating their own strategies.

One aspect of this fuinctionality is thus directed to a method for representing at least one additional behavior of a first participant in an interactive computing environment, to a second participant. At least one additional behavior of the first participant is identified, the at least one additional behavior including a participant behavior beyond a mandated behavior dictated by rules of the computer interaction. An indicator is associated with the at least one additional behavior. Actions of the first participant are monitored to detect an occurrence of the at least one additional behavior. Upon detecting the occurrence of the at least one additional behavior, a signal is caused to be communicated, signifying the occurrence of the at least one additional behavior. Upon receiving a signal signifying the occurrence of the at least one additional behavior, the indicator of the at least one additional behavior is generated so that the occurrence of the additional behavior potentially is detectable by the second participant.

By way of example and not limitation, the interactive computing environment may include a game, and the mandated behavior dictated by the rules of the game, while the at least one additional behavior includes a behavior not dictated by the rules of the game to complete one of a turn or a move. In this case, the at least one additional behavior may include, for example, either manipulating an displayed object in a manner that does not complete either a turn or a move, manipulating an input device in a manner not directed to manipulating an displayed object, applying a degree of force in initiating the mandated behavior, or interacting with a window presented by the first computing system other than a window in which the computer interaction is presented. The interactive computing environment may further include, for example, a messaging system, a conferencing system, or a transactional system. Many other types of interaction between participants can benefit from the approach employed for providing non-essential but useful information related to the behavior of one participant to one or more other participants in the interaction.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIGS. 1A-1G show exemplary screens from a conventional interactive computing environment in which one participant engages in a series of behaviors, but the only information regarding this behavior received by the second participant is a final move made by the first participant;

FIGS 2A-2D, 3A-3D, 4A-4D, and 5A-5B show screens from an interactive computing environment such as a card game in which, according to one exemplary embodiment, a first participant's peripheral behavior is communicated to a second participant;

Figure 9A:
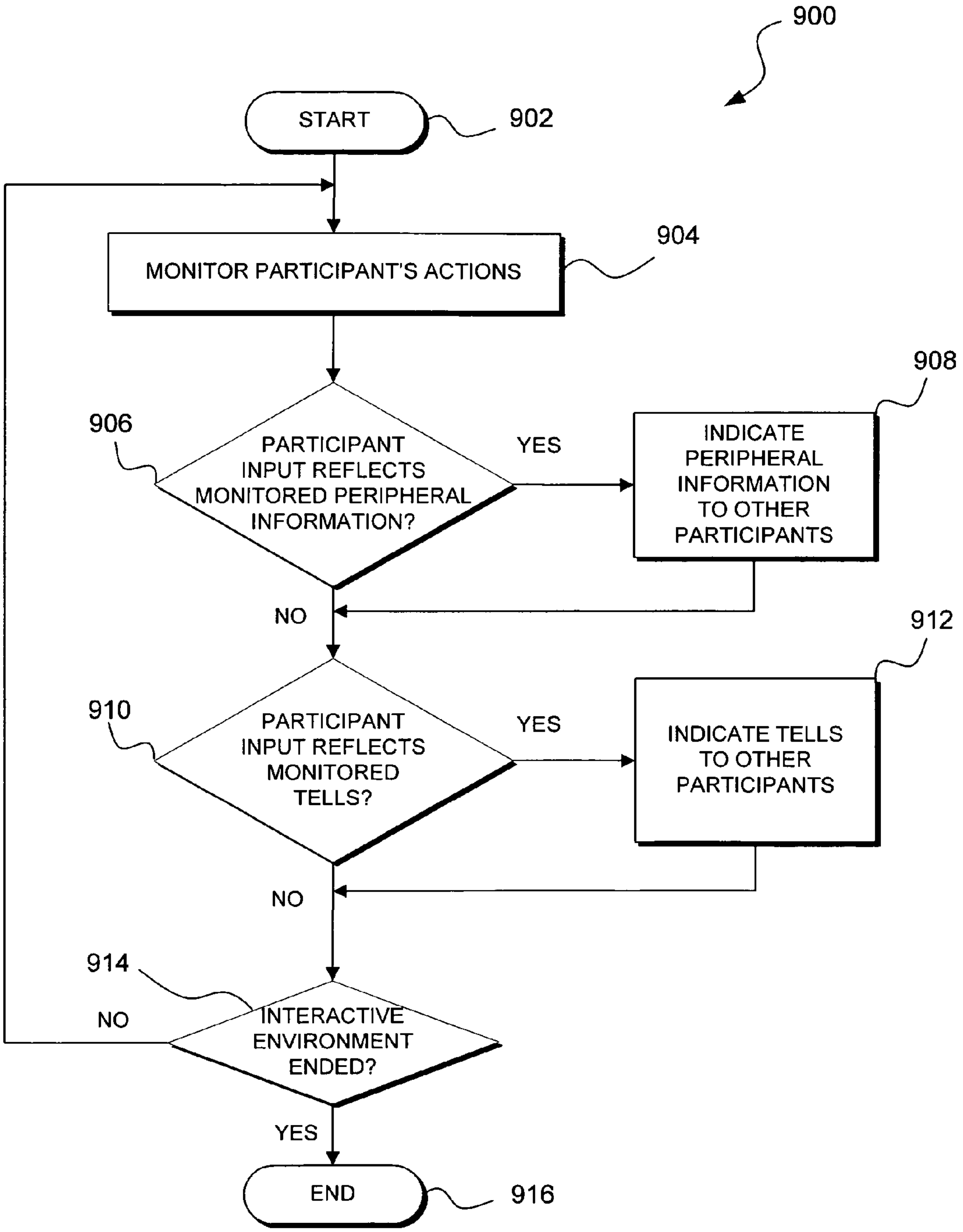
FIG. 9A shows a flow diagram illustrating exemplary logical steps for communicating additional behavioral information regarding one participant in an interactive computing environment, to at least one other participant.
Figure 9B:
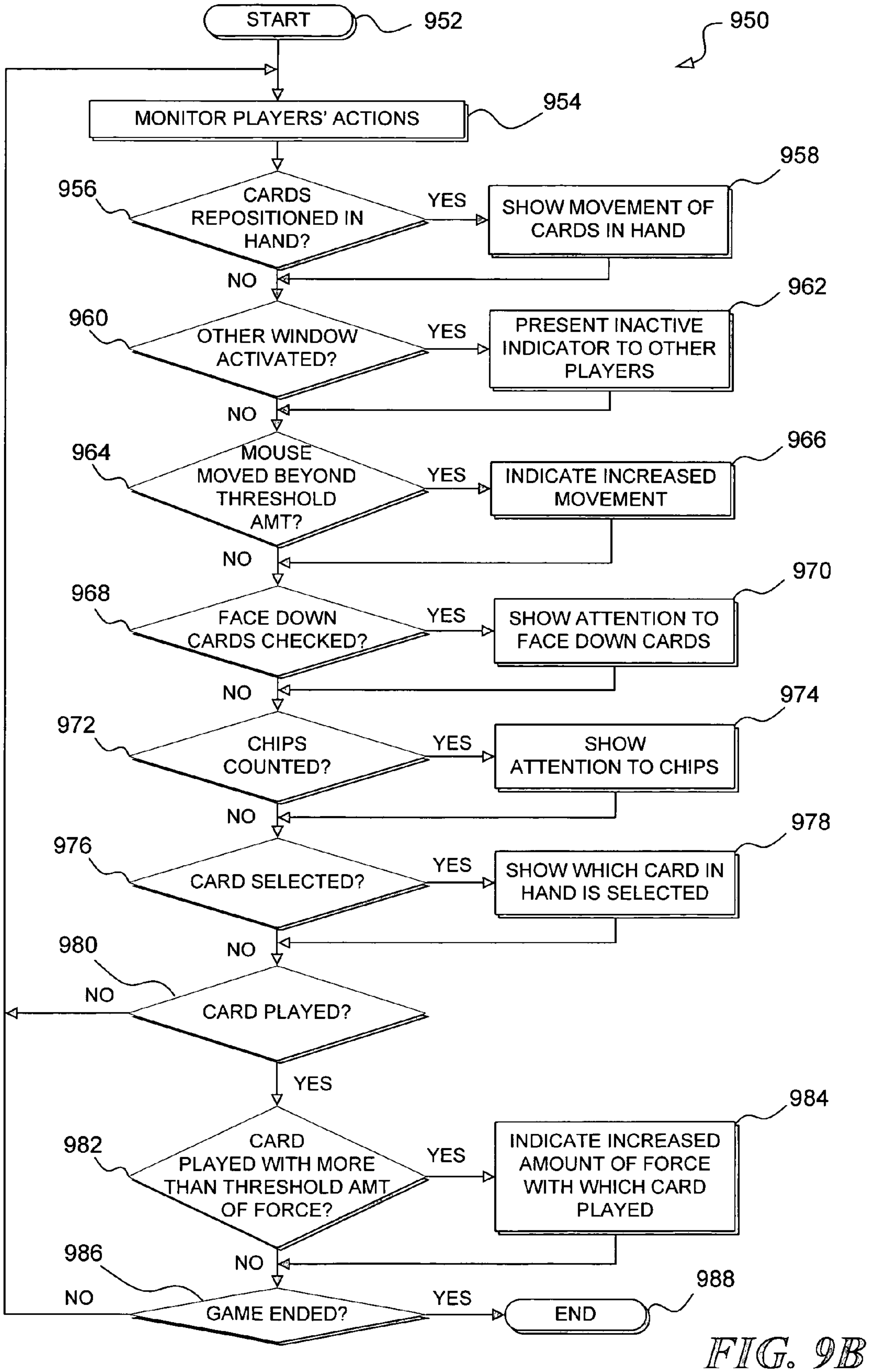
Figure 10:
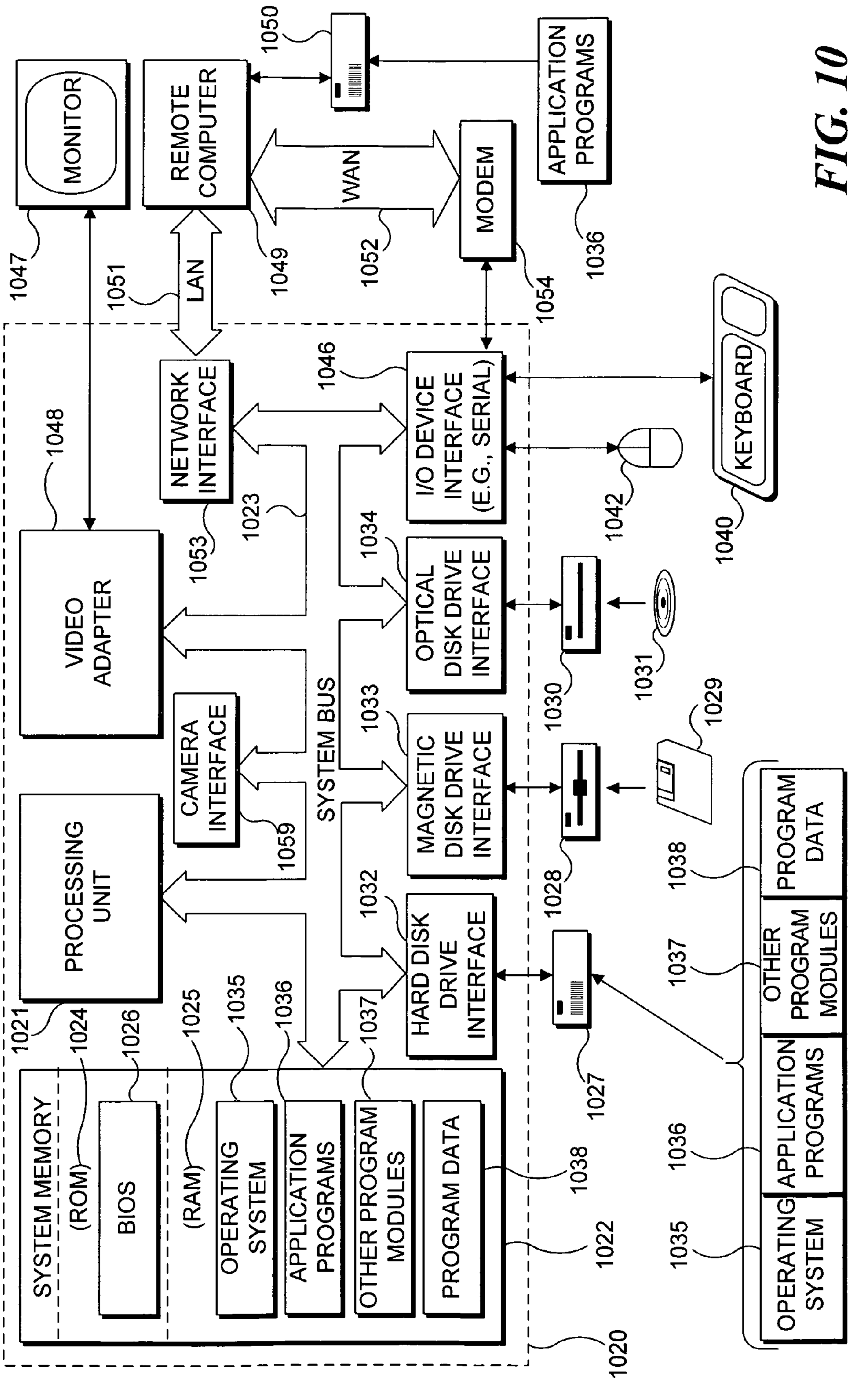

FIG. 9B shows a flow diagram illustrating exemplary logical steps for communicating peripheral information and tells resulting from behavior of one participant in a computer-based card game, to at least one other participant; and FIG. 10 is a functional block diagram of a generally conventional computing device or personal computer (PC) that is suitable (among other types of computing devices) for use in practicing the present invention.

DESCRIPTION

Figures and Disclosed Embodiments are not Limiting

Exemplary embodiments discussed below are illustrated in referenced Figures of the drawings. It is intended that the embodiments and Figures disclosed herein are to be considered illustrative rather than restrictive.

On-Line Card Game Employing an Embodiment of the Present Invention

FIGS. 2A through 2D illustrate screens 200*a* through 200*d*, respectively, from an interactive computing environment in which two participants are playing an online card game. More particularly, screens 200*a* and 200*b* show a first player moving a card 202 to another position in the first player's hand 204, using cursor 206 to drag card 202 along path 208 to its new position as shown in screen 200*b*. The moving of card 202 to another position in the first player's hand may indicate to the second player that the first player is collecting cards of similar suit or rank. On the other hand, moving card 202 may mean nothing at all, it might suggest that the first player is indecisive, or moving card 202 may represent an attempt to bluff the other player. In any case, sitting across from the first player at a real card table, the second player could observe the first player's actions over time and determine whether such movements might suggest to the second player the quality of the cards that the first player is holding. However, as described above in connection with FIGS. 1F and 1G, the second player would not be shown any movement of the first player's cards until the first player actually played a card, and any information the second player might gain from the first player's actions is not available to the second player in a conventional online interaction.

Figure 2A:
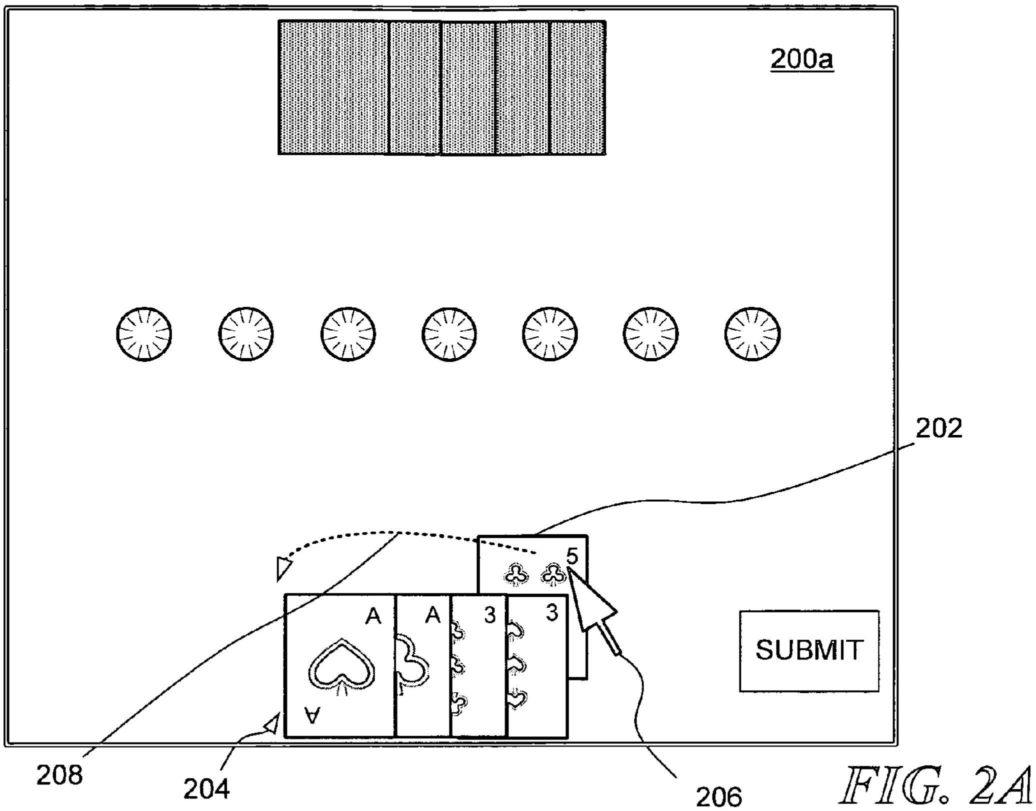
Figure 2B:
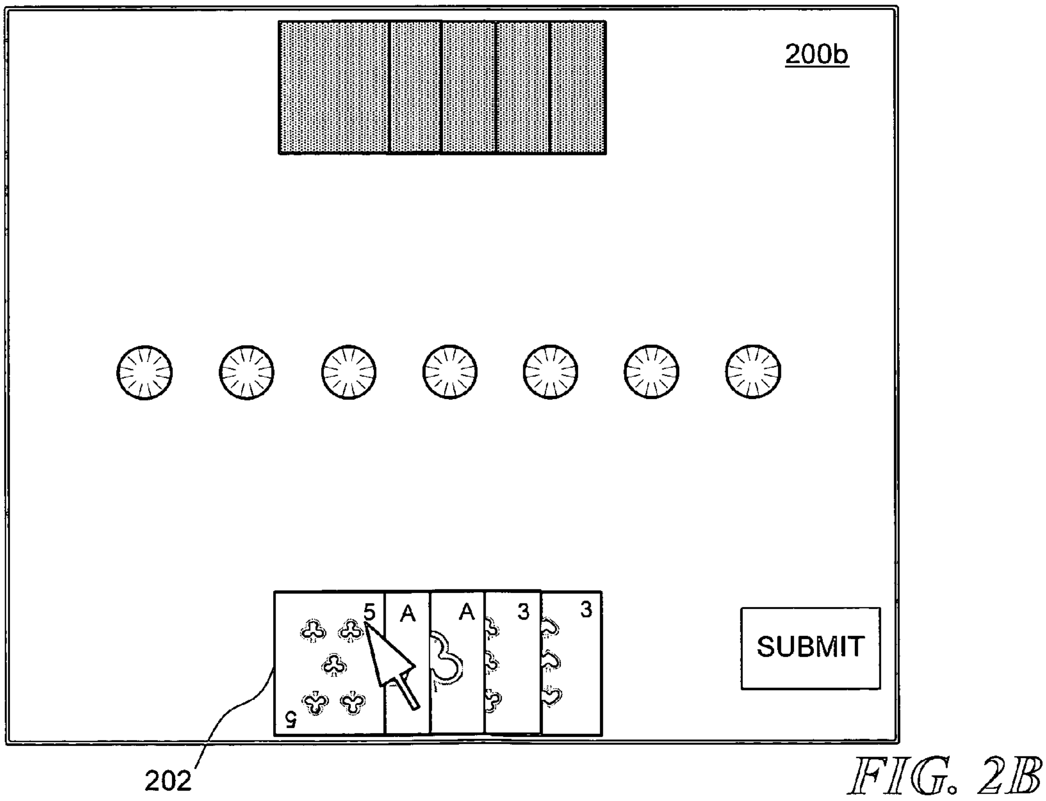
Figure 2C:
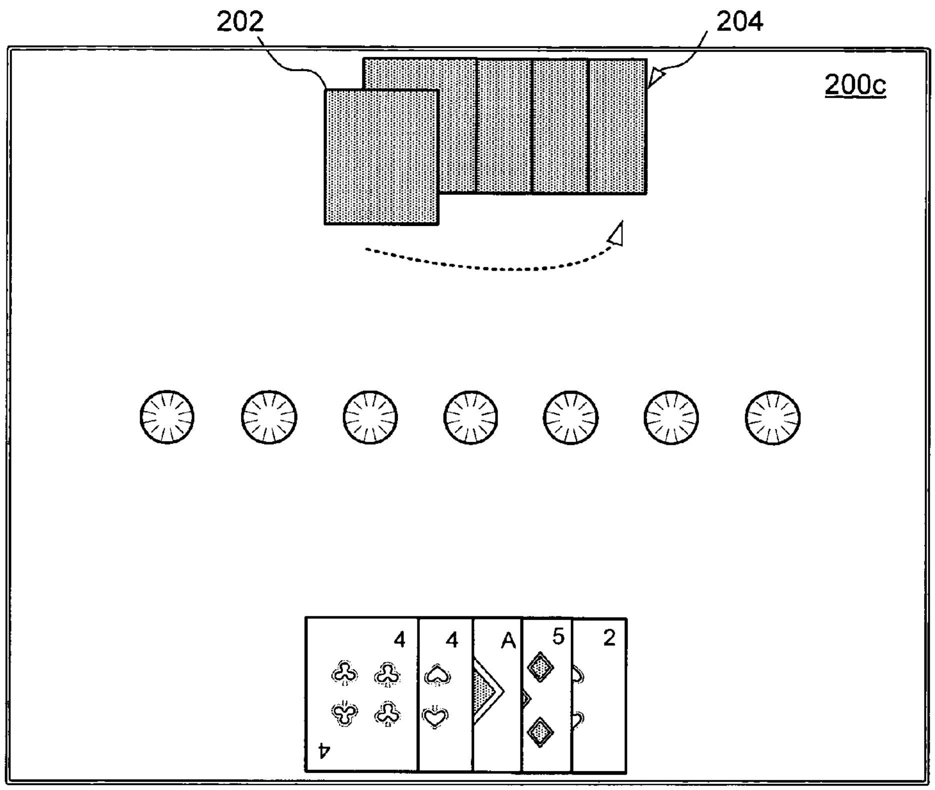
Figure 2D:
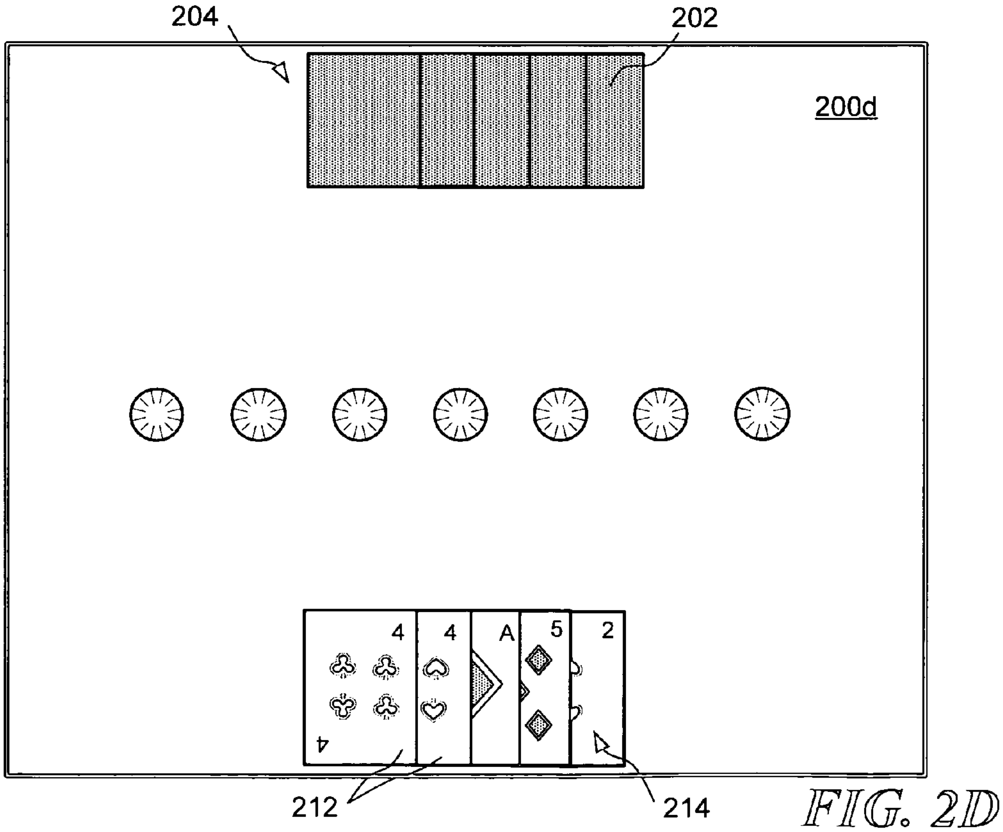

However, as shown in screens 200*c* and 200*d* of FIGS. 2C and 2D, which show a second player's view of the game, respectively, according to one embodiment of the new development described herein, the first player's actions, beyond those involved in completing a turn or a play as dictated by the rules of the game, are indicated to the second player in an online interaction. Thus, as shown in screen 200*a* of FIG. 2A, just as the first player moves card 202 to another position in first player's hand 204, the movement of card 202 is indicated to the second player in screen 200*c*. The second player, who is able to view cards 212 in his own hand 214, is not able to see the values of cards in the first player's hand 204. However, just as in an actual card game that is played face-to-face, the second player can determine that the first player is manipulating card 202 in first player's hand 204 and can derive from the movement whatever information the second player might.

Figure 3A:
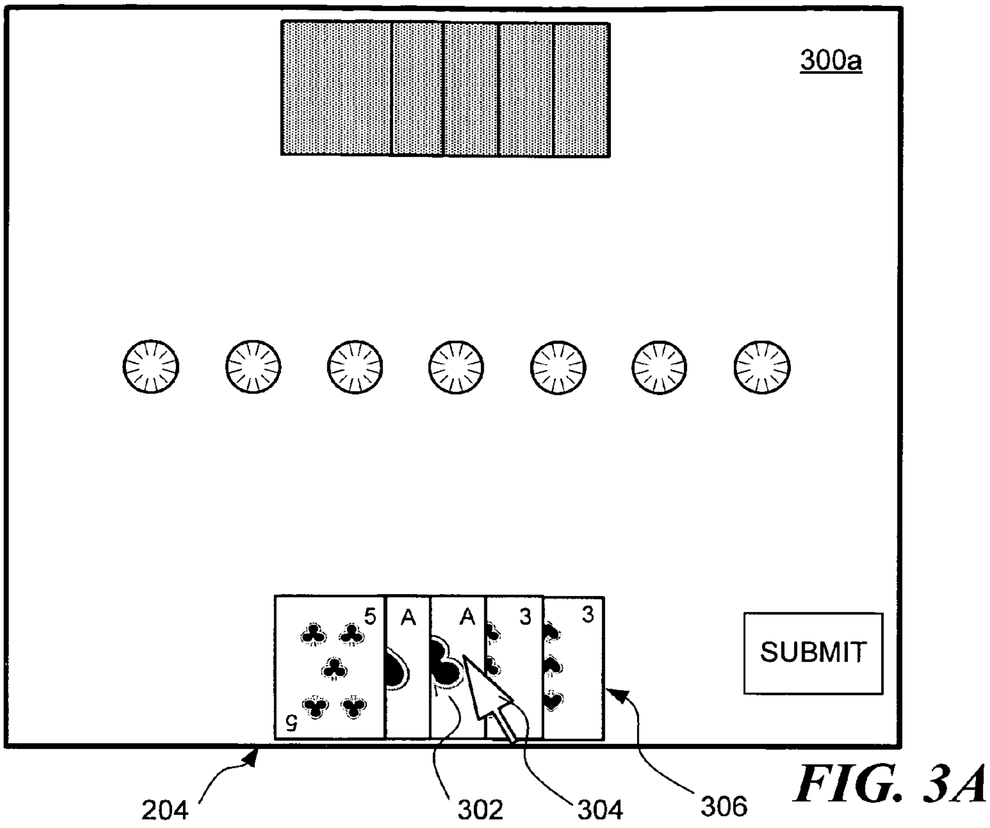

Similarly, other actions besides those required of a participant in an interactive computing environment to complete a turn or make a move, or carry out some other function, also can be communicated or indicated to other participants, even when the actions do not result in movement of an object. For example, as shown in screen 300*a* of FIG. 3A representing an on-line card game, a player might play a card 302 by placing a cursor 304 over card 302, and either double-click with a pointing device (not shown) or by use the pointing device to direct cursor 304 to drag card 302 out of the player's hand. Before choosing to play a particular card, a player might let cursor 304 linger over card 302, or might select card 302 by clicking with the pointing device, but then decide not to play card 302. In an actual card game, other players might see the player staring at card 302, or touching an edge of card 302, before playing a different card from a hand 306 of the player. Such an action may be attempt by the first player to bluff the other players, or it might signal indecision. As noted above, in a convention online interaction, any information that may be gleaned from the first player's actions prior to actually playing a card is not available to other players.

Figure 3B:
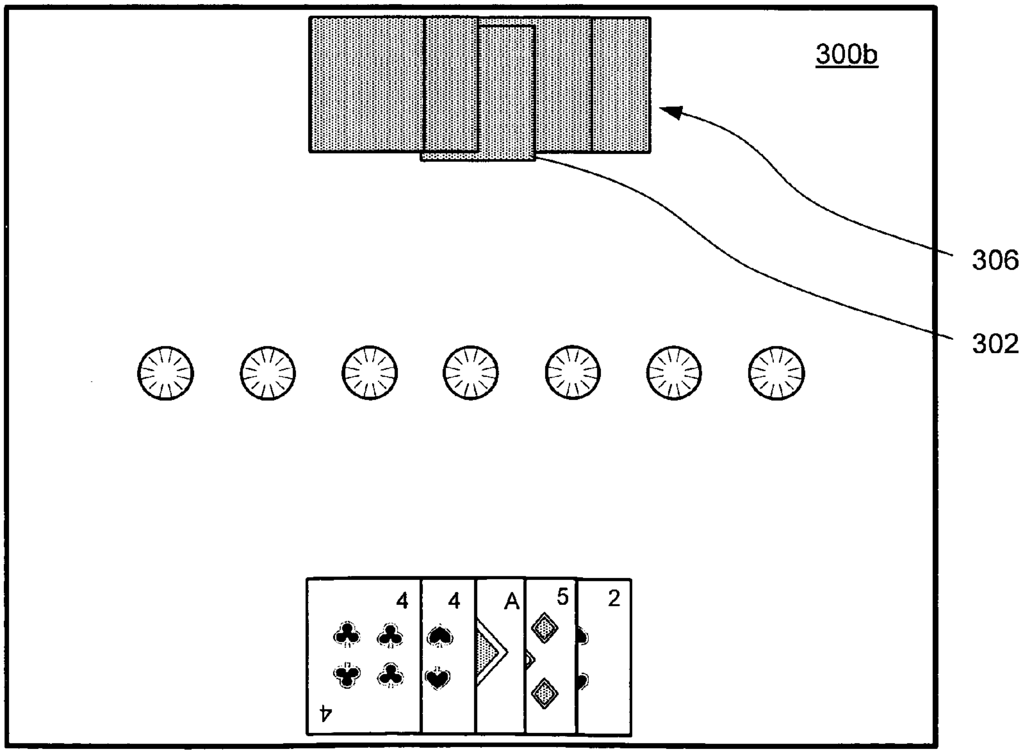

On the other hand, according to an embodiment of this new development, as shown in a screen 300*b* of FIG. 3B, which conveys a second player's view of the game, if the first player were to allow his cursor (not shown in FIG. 3B) to linger over card 302, or use a pointing device to select card 302, that action would be communicated or indicated to the second player. More specifically, card 302 would be partially displaced from the rest of the cards in first player's hand 306. Thus, the first player's attention to a particular card would be communicated or indicated to the second player.

Figure 3C:
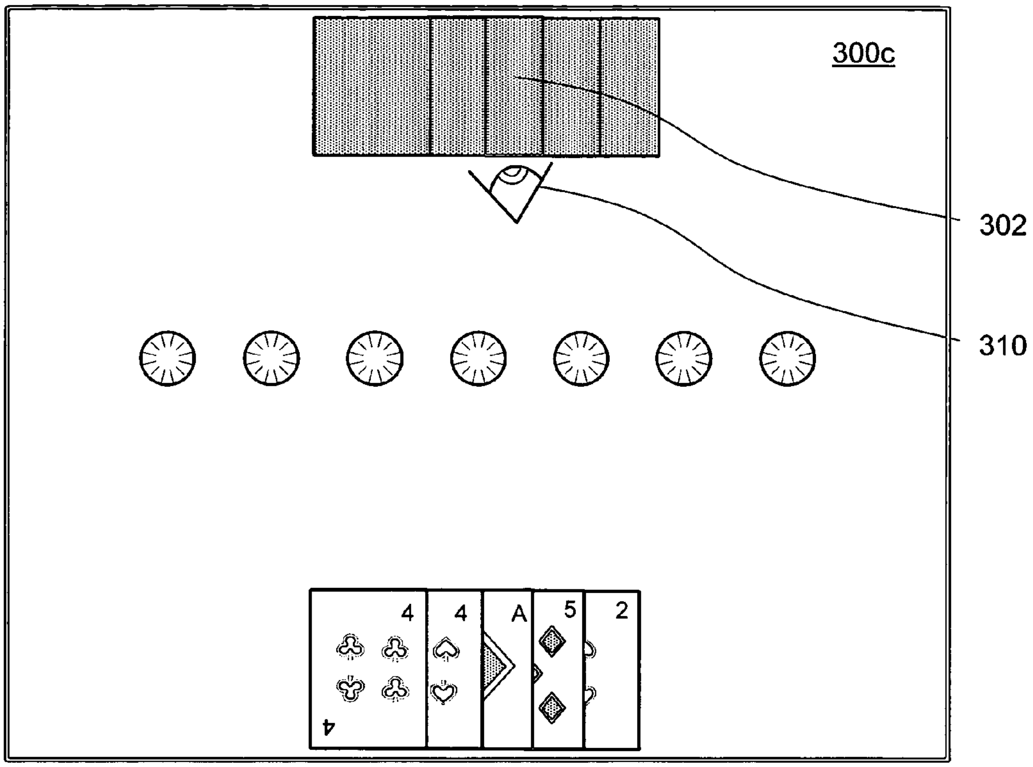
Figure 3D:
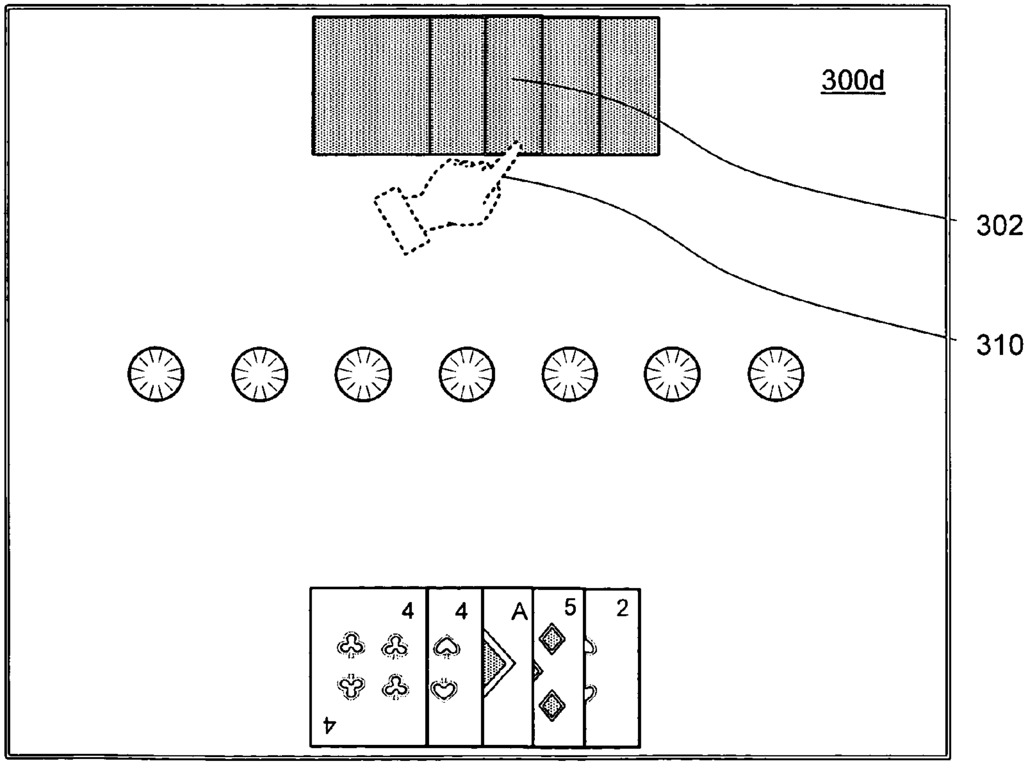

It should be appreciated that in an actual card game, a player may touch or stare at a particular card without actually moving it. Thus, other indicators could be used to show the second player that the first player is causing a cursor to linger over card 302, or may have initially selected card 302 using the cursor. For example, as shown in a screen 300*c* of FIG. 3C, when the first player causes his cursor to linger over card 302, an eye icon 310 is shown over card 302, as viewed by the second player. Alternatively, as shown in a screen 300*d* in FIG. 3D, if the first player selects card 302 with a pointing device, even if the first player does not play card 302, a hand icon 312 appears over card 302 to show that the player may be thinking or considering playing card 302. It should be appreciated that many other suitable indicators could be used to manifest the first player's attention or actions to the second player, and that such indicators may or may not be differentiated to manifest whether a player has caused his cursor to linger over a particular card for an extended period of time, i.e., for at least a predefined measurement or threshold time, or whether the player has actually selected a particular card. For example, an eye icon 310 could change color or intensity, or otherwise change in appearance the longer that the first player's cursor lingers over a particular card. Similarly, once the first player causes the cursor to no longer linger over a particular card and actually selects a card, eye icon 310 may change into a hand icon 312. Similarly, in a different game, if a player makes an initial selection of another type of object, but does not complete an action associated with the object initially selected, that initial selection can be communicated to the other players as a tell.

Figure 4A:
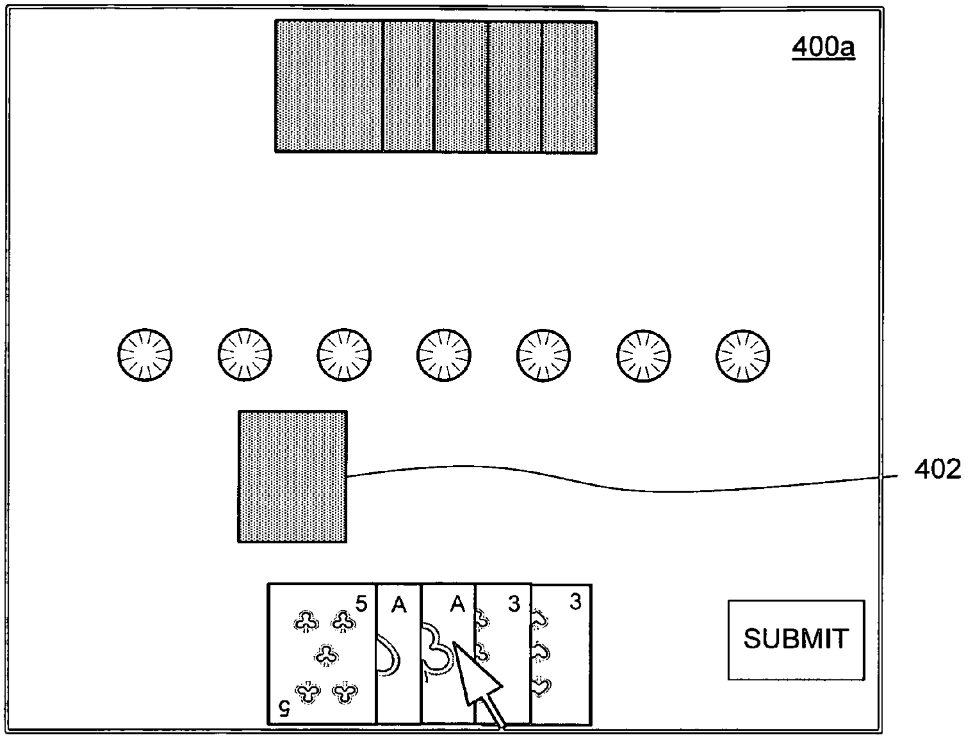
Figure 4B:
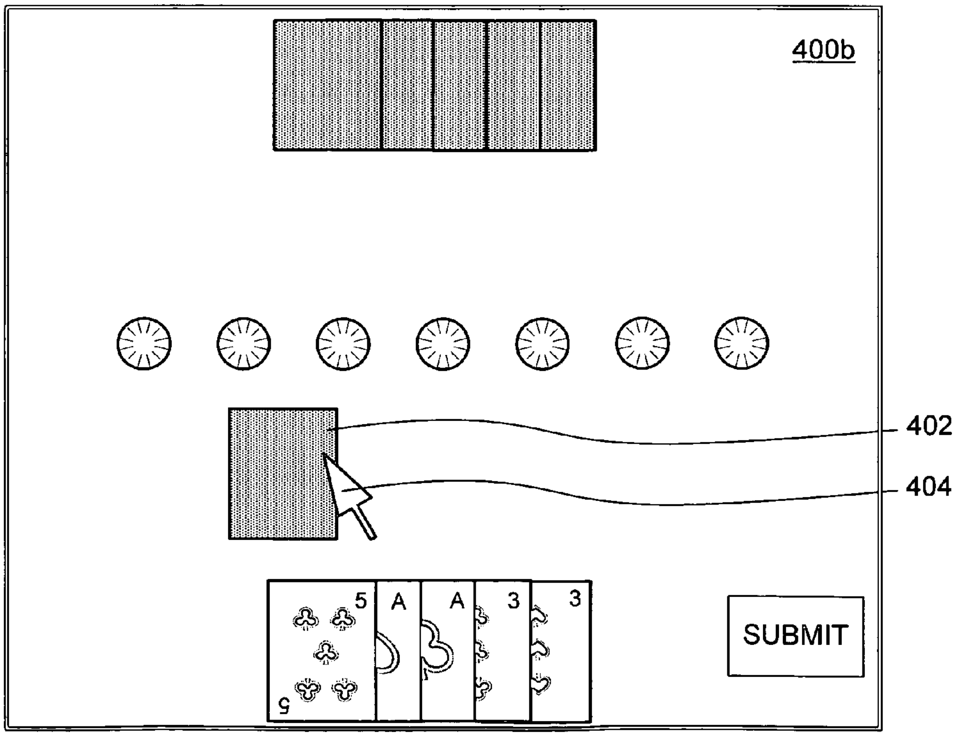
Figure 4C:
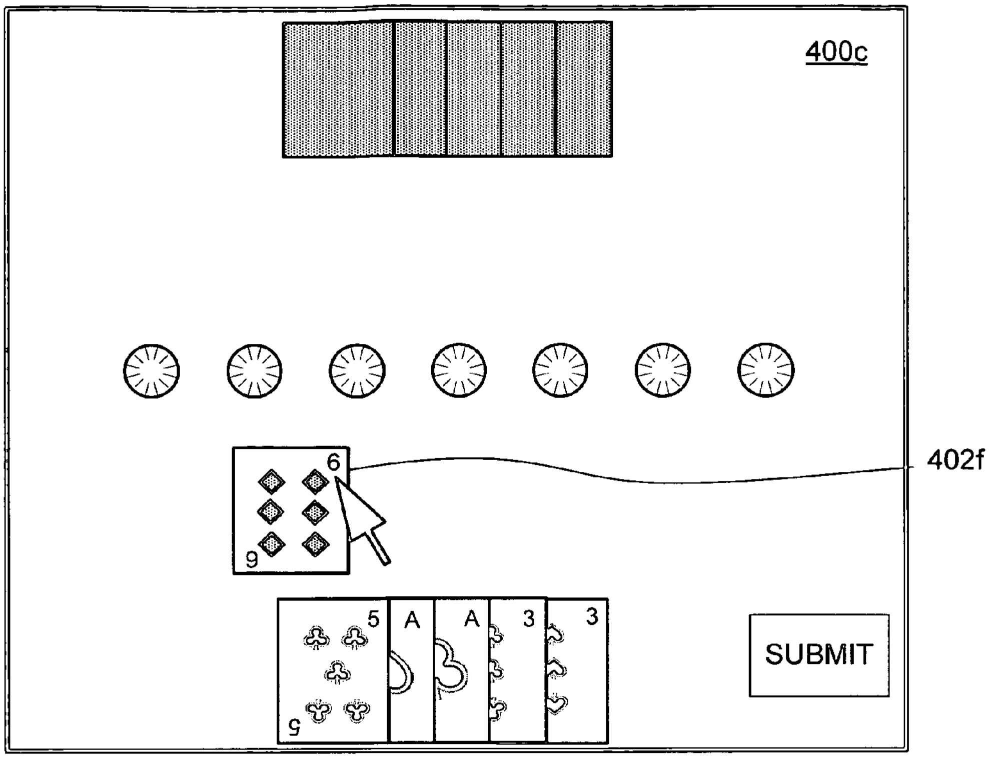

For the exemplary use in games and other interactive computing environments, various embodiments are neither limited to communicating a participant's actions preceding a play or a move, nor are they limited to objects within the participant's control. For example, in the on-line card game shown in a screen 400*a* of FIG. 4A, in contemplating another play, the first player may wish to glance at a card 402 previously played face down on the virtual table. The first player may wish to look at the face of card 402 to consider the rank or suit of the card, because the first player has forgotten those parameters for card 402, or may just wish to look at card 402 in considering his/her next play. As shown in a screen 400*b* of FIG. 4B, to check the face of card 402, the first player may cause cursor 404 to move over card 402, and as shown in a screen 400*c* of FIG. 4C, use a pointing device (not shown) to select card 402, causing face 402*f* of card 402 to be exposed to the first player. In an actual card game, other players would be able to see the first player look at face 402*f* of card 402.

Figure 4D:
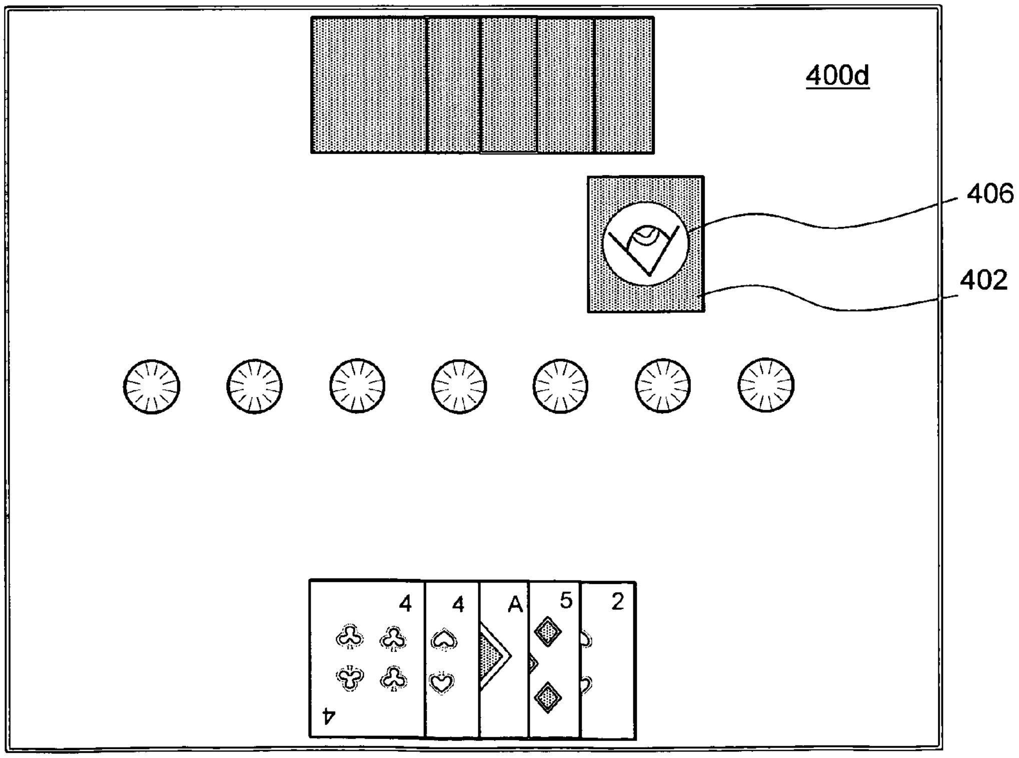

As shown in a screen 400*d* of FIG. 4D, according to an exemplary embodiment of this new development, other players also are able to know that the first player has checked face 402*f* of card 402. When the first player performs any control action or actions that are necessary to view face 402*f*, an indicator such as eye icon 406 is presented adjacent to or over card 402. Other players cannot see face 402*f*, but it is communicated to them that the first player has checked face 402*f*.

Figure 5A:
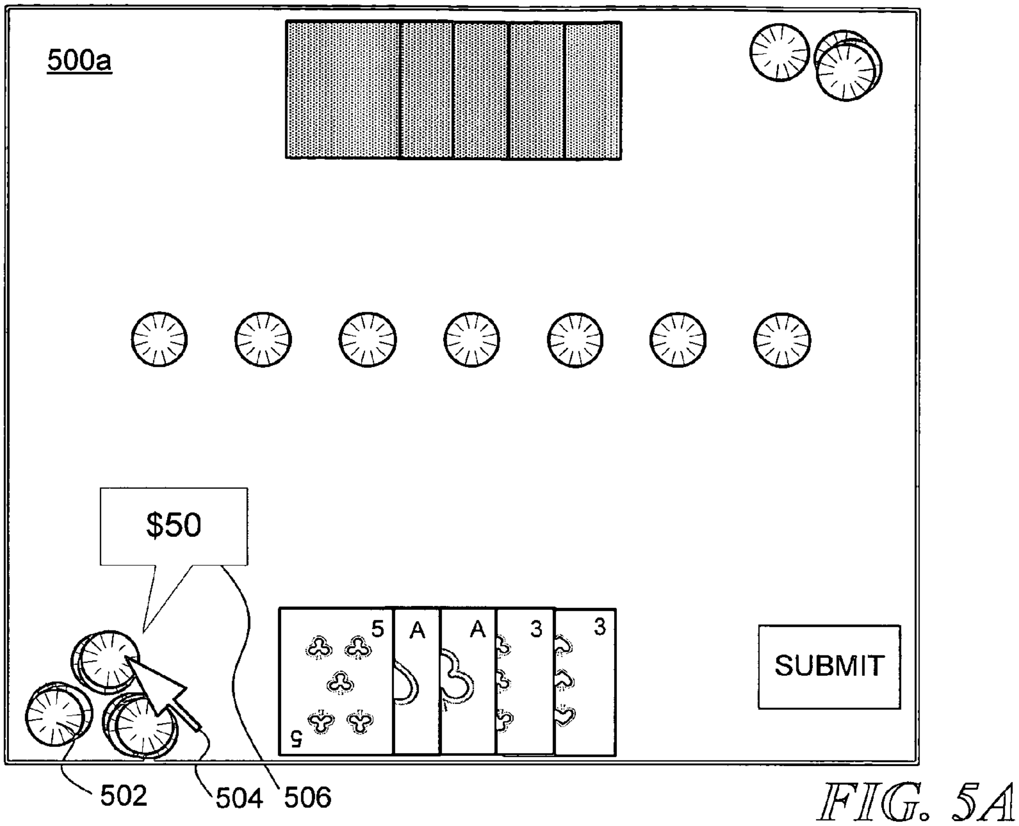

In addition, as shown in screen 500*a* of FIG. 5A, in many card games, players also each have a number of virtual chips 502. Players in real card games may count or estimate the value of their chips or the chips of another player in determining their next move(s) or their strategy. As shown in a screen 500*a*, a first player may count the value of his own chips 502 by moving a cursor 504 over chips 502, resulting in a value indicator 506 displaying the value of chips 502 to the first player.

Figure 5B:
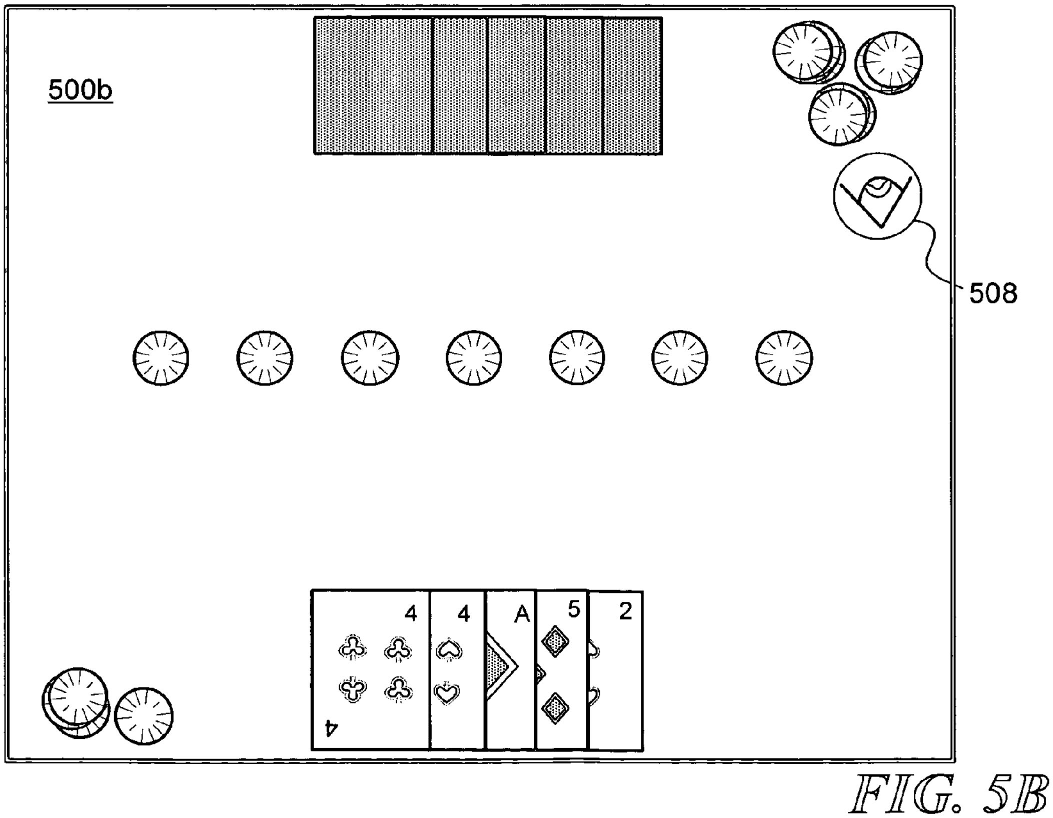

In an exemplary game in which an embodiment of this new development is used, as shown in a screen 500*b* of FIG. 5B representing a second player's view of the game, when a first player is "counting" his/her chips, as shown in FIG. 5A, an eye icon 508 appears over first player's chips 502. Thus, the second player has a chance to see the first player considering his/her chips 502, and make any related determination that the second player will about the first player's actions. Similarly, eye icon 508 or another indicator—such as value indicator 506—may be used to indicate to other players when the first player is considering the value of his/her own chips, or that of other players.

Thus, in the example of an on-line poker game to which an embodiments of this new approach is applied, other players are provided with information about a first player's actions that is peripheral to the first player's plays or moves, adding richness and realism to the interactive gaming computing environment.

Other Exemplary Games Employing an Embodiment of this New Development

Peripheral information regarding the actions of other participants prior to, ancillary to, or after completing a play or turn has value to a participant in interactive computing environments other than card games. Thus, embodiments of this new development also add richness and realism to these other interactive computing environments.

Figure 6A:
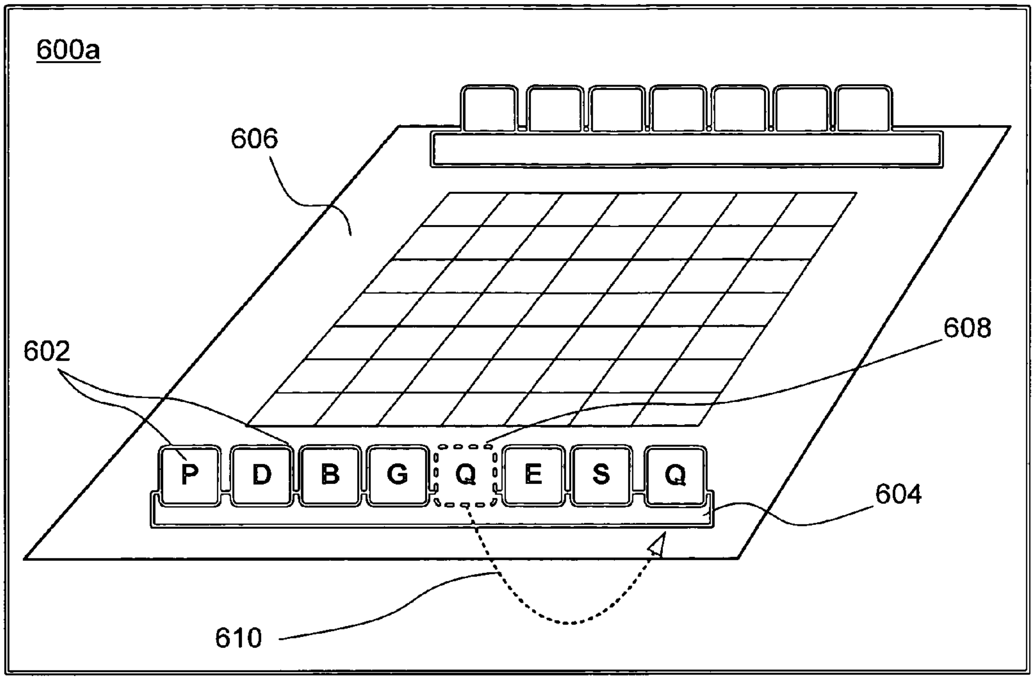
FIGS. 6A-6B and 7A-7D show screens from other interactive computing environments involving games other than card games in which, according to another exemplary embodiment, peripheral information about a first participant's behavior is communicated to a second participant.

For example, word games, such as SCRABBLE™ manufactured by Hasbro, Inc., involve spelling words using letter tiles or cubes. The letters each player has are typically unknown to other players. Thus, as shown in a screen 600*a* of FIG. 6A, each player may have letter tiles 602 arrayed in a rack 604 so that one player cannot view another player's letter tiles 602 before the letter tiles are played on a playing board 606.

As shown in screen 600*a*, just as card players may wish to rearrange cards held in their hands, players of other games may wish to adjust their playing pieces, e.g., to place like letters together or to organize the letter tiles alphabetically, or in groups forming one or more whole words and/or parts of a word. Also, just as in card games, movement or touching of these pieces by one player may potentially provide information to other players that may prove useful. In screen 600*a*, a first player has a Q tile 608. The tile may have great value, or the first player may be unable to play Q tile 608 until the player draws other tiles or after another player plays specific tile(s) (e.g., a U tile). Thus, the first player may move Q tile 608 along a path 610 to another position on rack 604, where Q tile 608 will be out of the way until it becomes possible to play Q tile 608.

Ordinarily, the moving of tiles is permitted in an on-line version of such a game; however, other participants are unable to see the movement of the tiles and instead only see the tiles that are played on the board. A seasoned player may see a first player move tile 608 to an end of rack 604 and speculate that tile 608 bears a J, Q, X, Z, or other tile that the first player might desire to or be forced to wait to play. However, in a conventional online interactive environment, the other participants would not see the first player move tiles until the first player completed a move or turn.

Figure 6B:
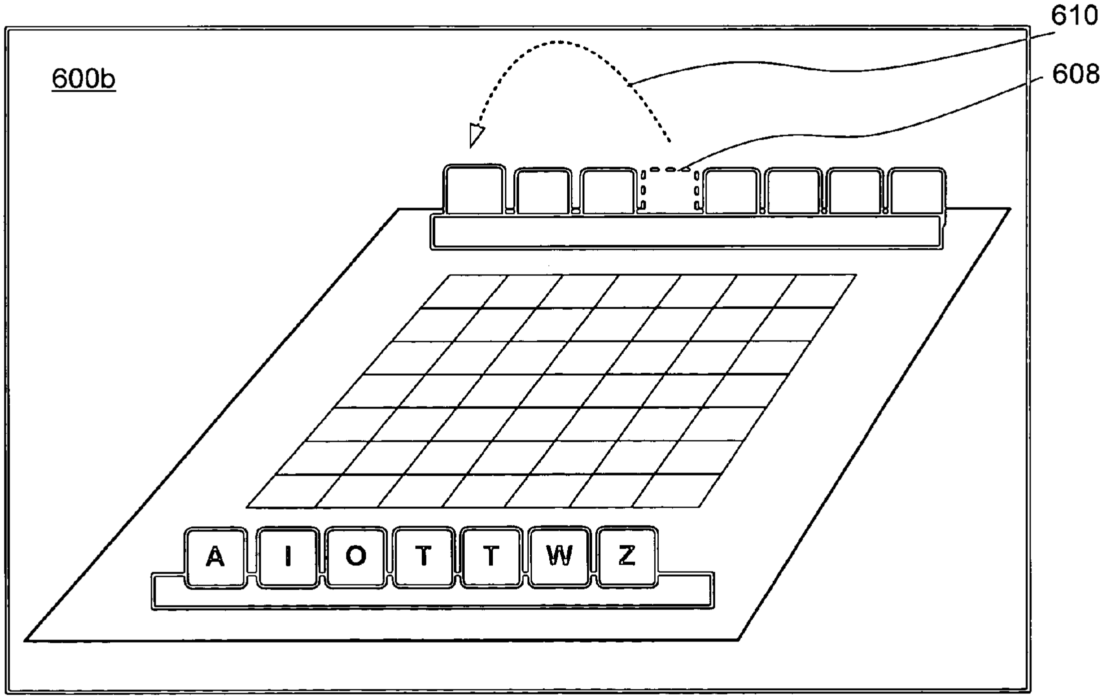
Figure 7A:
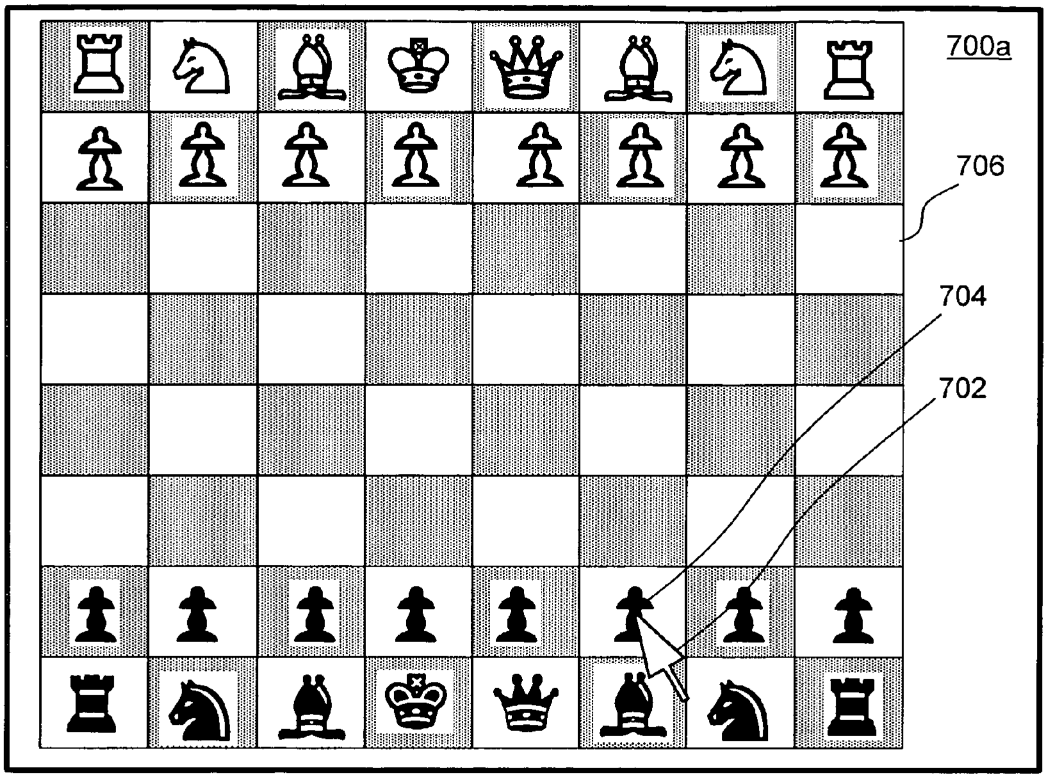
Figure 7B:
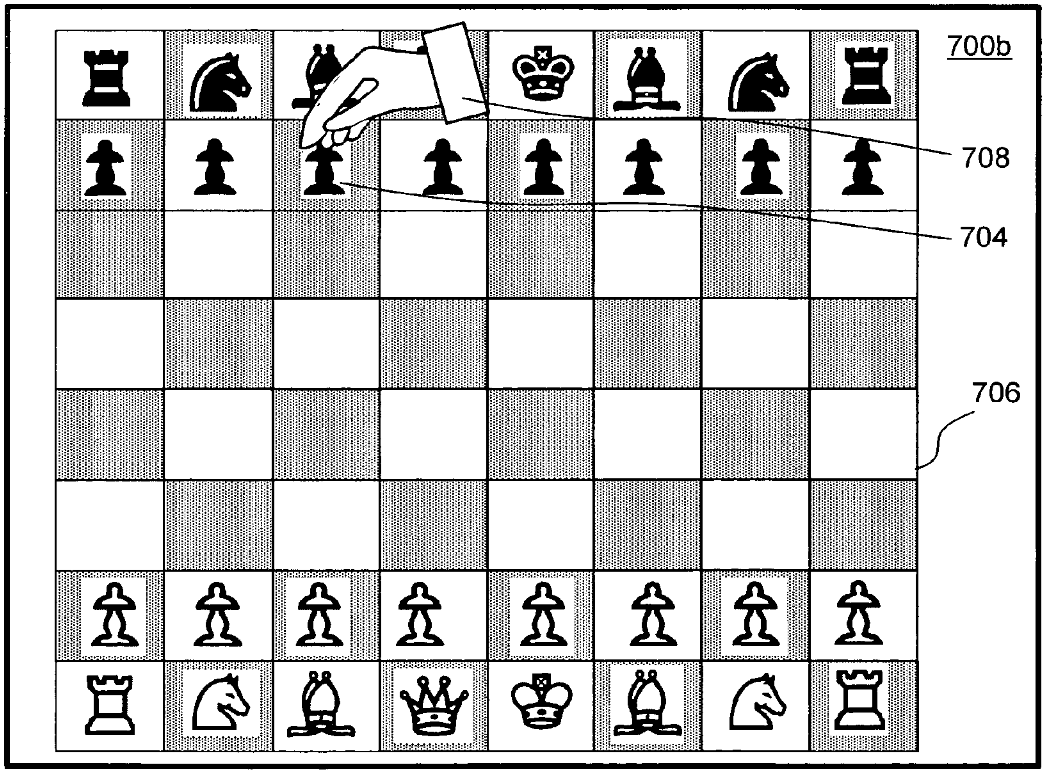
Figure 7C:
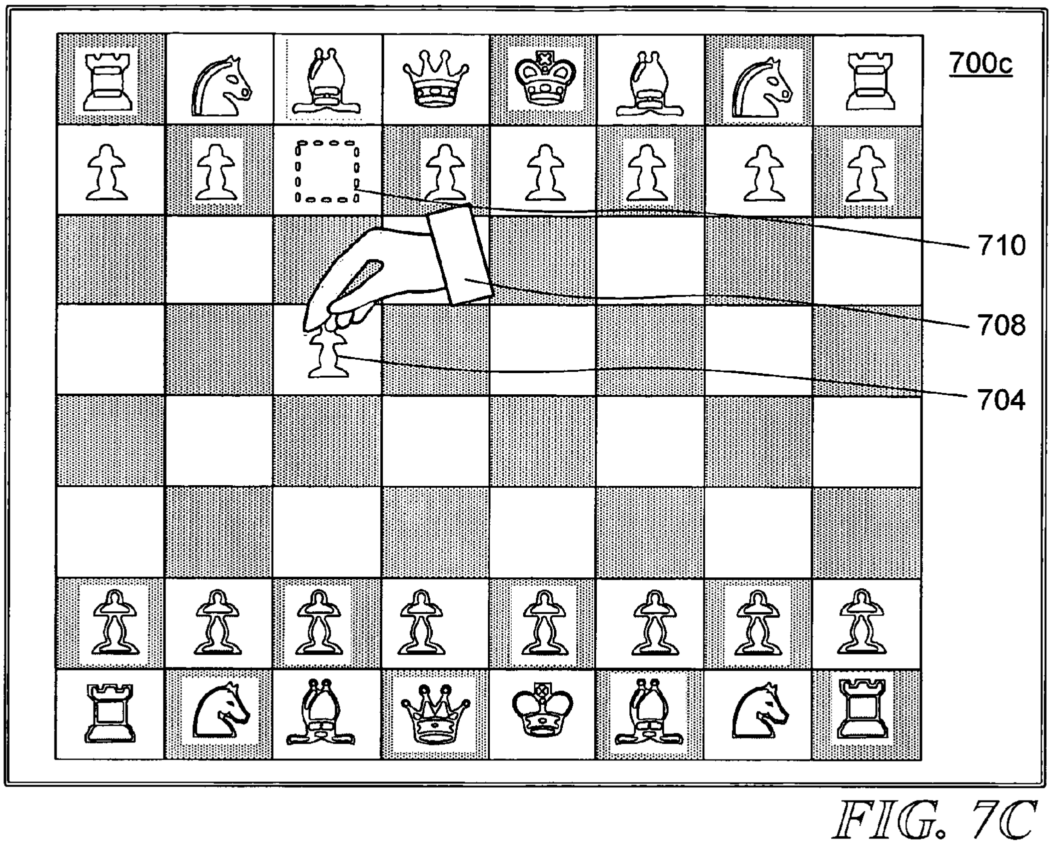
Figure 7D:
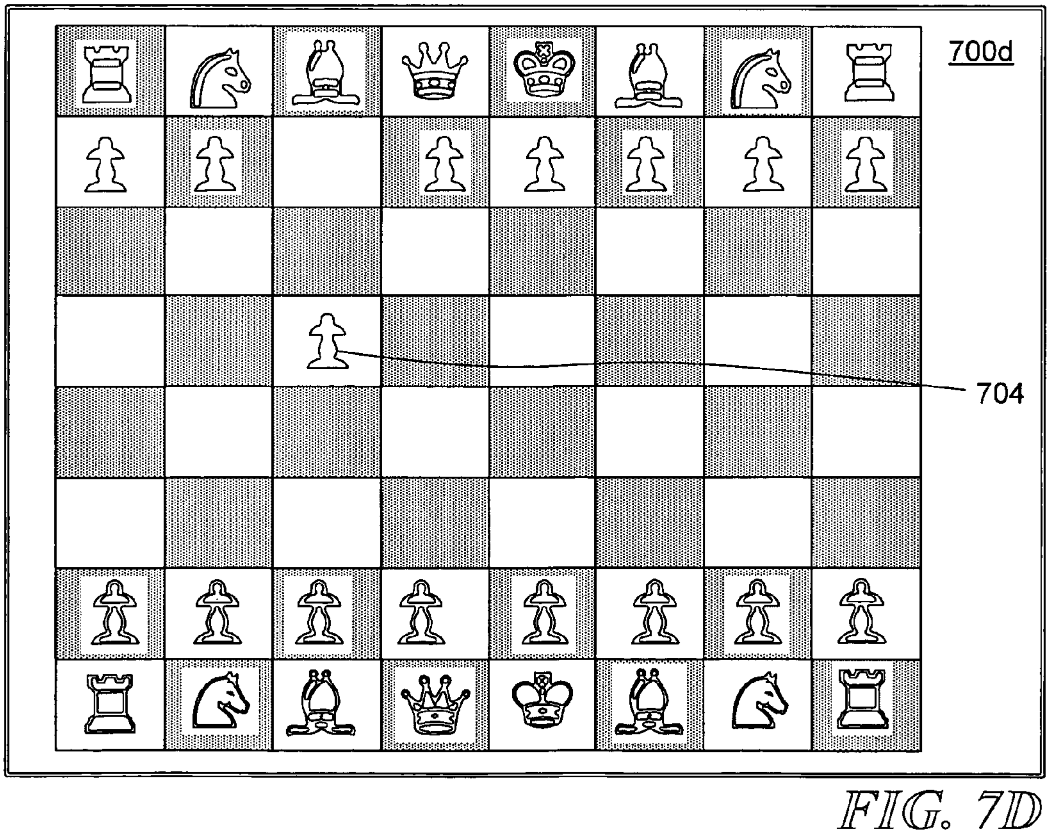

However, as shown in a screen 600*b* of FIG. 6B showing a second player's view of the game illustrated in screen 600*a* (FIG. 6A), as the first player moves Q tile 608 to an end of rack 604, the second player also can see the movement of tile 608. Being able to see movement of tile 608 may allow the second player to infer what letter tile 608 bears, and act accordingly. Thus, for example, if the second player correctly concludes that tile 608 bears a Q or some other specific letter, the second player may be careful not to play a tile bearing the letter U (or other letter), if the first would benefit from that placement.

Embodiments of this new development are adaptable to a number of interactive computing environments where playing pieces are used. As another example, screens 700*a* through 700*d* of FIGS. 7A through 7D, respectively, show how an embodiment may add further richness and depth to an on-line chess game. Screen 700*a* shows a first player causing a cursor 702 to move over a piece 704 on a board 706, as though the first player is contemplating moving piece 704 to that position on the board. Screen 700*b*, showing the second player viewing board 706, includes a hand indicator 708 that is poised over piece 704, communicating to the second player that the first player might be considering moving piece 704. It is understood that good players do not touch their pieces while contemplating a move, except perhaps to confuse an opponent. Instead, a good chess player only watches the board and plans moves mentally. In typical on-line chess games, the second player would not know if the first player was hinting at the next move by "touching" cursor 702 to piece 704. However, as shown in screens 700*a* and 700*b*, if a player should make such an overt gesture, it would be communicated to the second player with hand indicator 708 or some other indicator.

In chess, a move is not final until a player not only moves a playing piece to a new (legal) position, but also releases the playing piece at that position. Again, in most on-line chess games, a player cannot only touch a piece without his opponent knowing it, but can move it around the board to consider the ramifications without his opponent knowing it, because a move is not presented to the opponent until the player releases the chess piece at its new position. However, as shown in screen 700*c* of FIG. 7C, if a player should move piece 704 but not release it, this action is still communicated to the second player by showing hand indicator 708 over piece 704, while indicating original position 710 of piece 704. If the first player should release piece 704 and, thus, complete the move, the hand indicator (not shown in FIG. 7D) is removed, leaving piece 704 in its new position. It will be appreciated that, without employing an embodiment of the new development, screen 700*d* in showing piece 704 at its new position is the only information that would be received by the second player, thereby concealing some of the first player's preliminary machinations that may well provide useful information to the second player.

From the examples of the card games (FIGS. 2A-5B) and the board games (FIGS. 6A-7D), advantages of the new development in interactive computing environments in which games are played should be clear. It should also be appreciated that the richness added to games similarly will be added to other types of interactive computing environments. For example, by monitoring actions of a first participant in on-line messaging sessions such as instant messaging sessions or chat rooms, conferencing sessions, financial transaction environments, and other interactive computing environments, embodiments of the new development may be similarly valuable in enriching the experiences of the participants. Taking the example of a chat room, typically other participants only see a message appear after another participant has finalized the message and hit "send" or "enter" to complete the messaging turn or move dictated by the parameters or rules of the session. Using an embodiment of the new development, however, if a participant repeatedly edited or retyped phrases, apparently taking pains to state just the right words, other participants may learn something about the participant's tone or attitude in regard to the textual exchange. Other participants could thereby, for example, detect hesitation, uncertainty, haste, and other aspects of the participant's behavior in responding and reacting to messages.

Communicating Tells According to an Embodiment

Peripheral information regarding the actions of participants prior to, ancillary to, or after completing a play or turn has value to participants in interactive computing environments other than card games. Thus, embodiments of the new development are useful in adding richness and realism to these other interactive computing environments. In addition, embodiments of the new development also are useful in communicating "tells" regarding the behavior of a participant arising from actions of which the participant may not be cognizant.

The types of peripheral behavior previously described include deliberate actions made by a participant, such as reordering cards, counting chips, touching cards or pieces, etc. However, in many face-to-face encounters, including games and other interactive situations, individuals may unconsciously act in a particular way that may manifest what they are thinking, even though they are unaware of it. In a real poker game, for example, a player nervous or excited about a hand may drum his or her fingers, make faces, or exhibit other telling behavior that the other players learn to "read," and to which they then may respond. Using embodiments of the new development, behavior measurable by a computing system similarly may be able to discern these tells and communicate or indicate them to other participants.

Figure 1A:
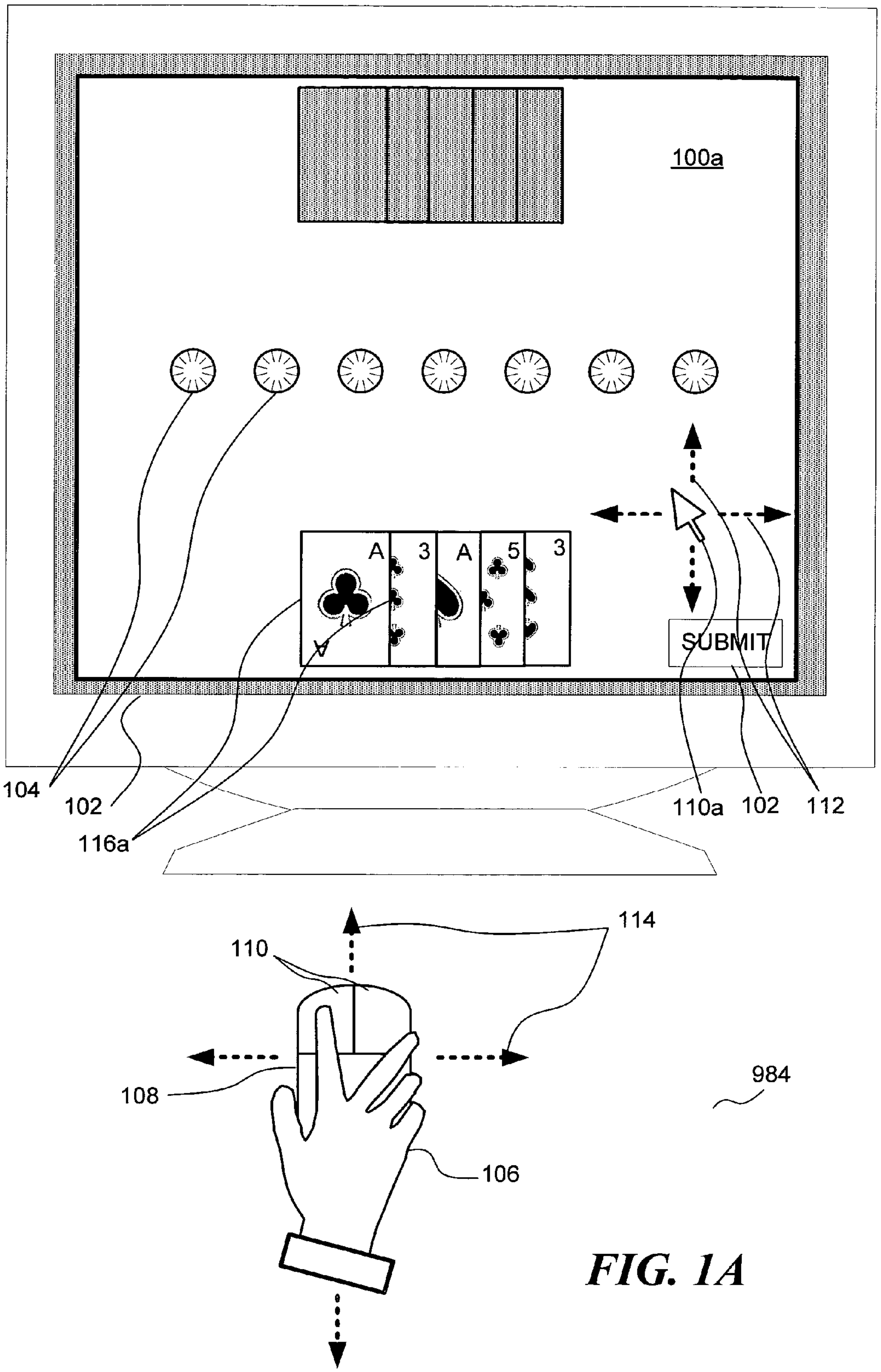
Figure 1B:
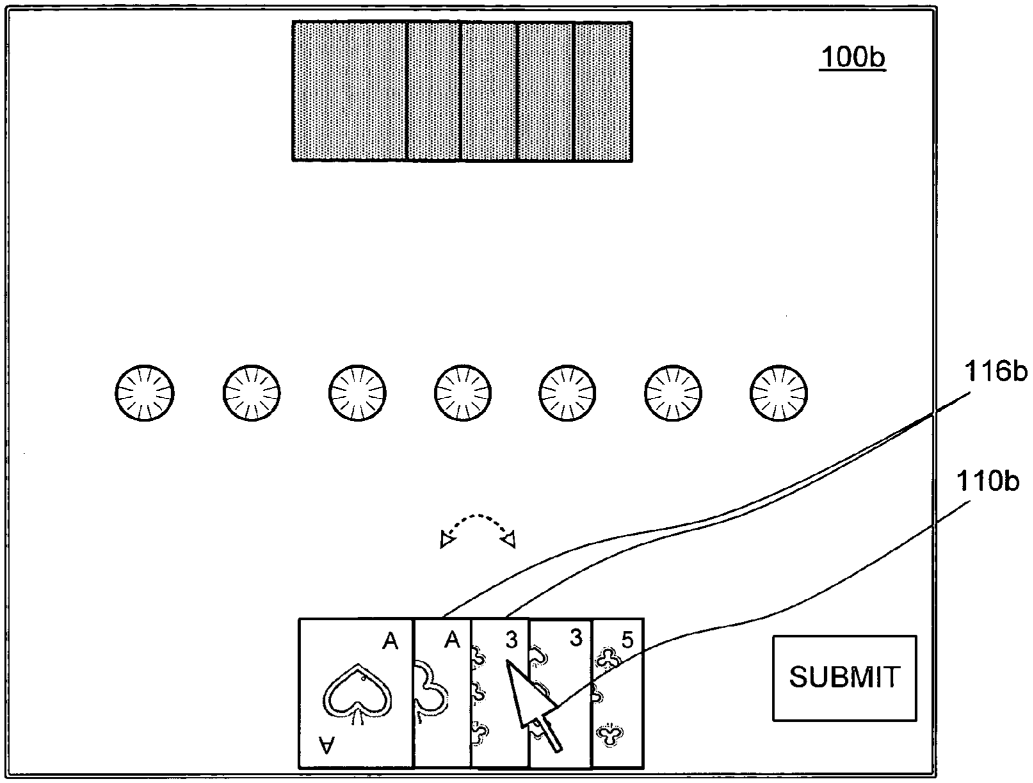
Figure 1C:
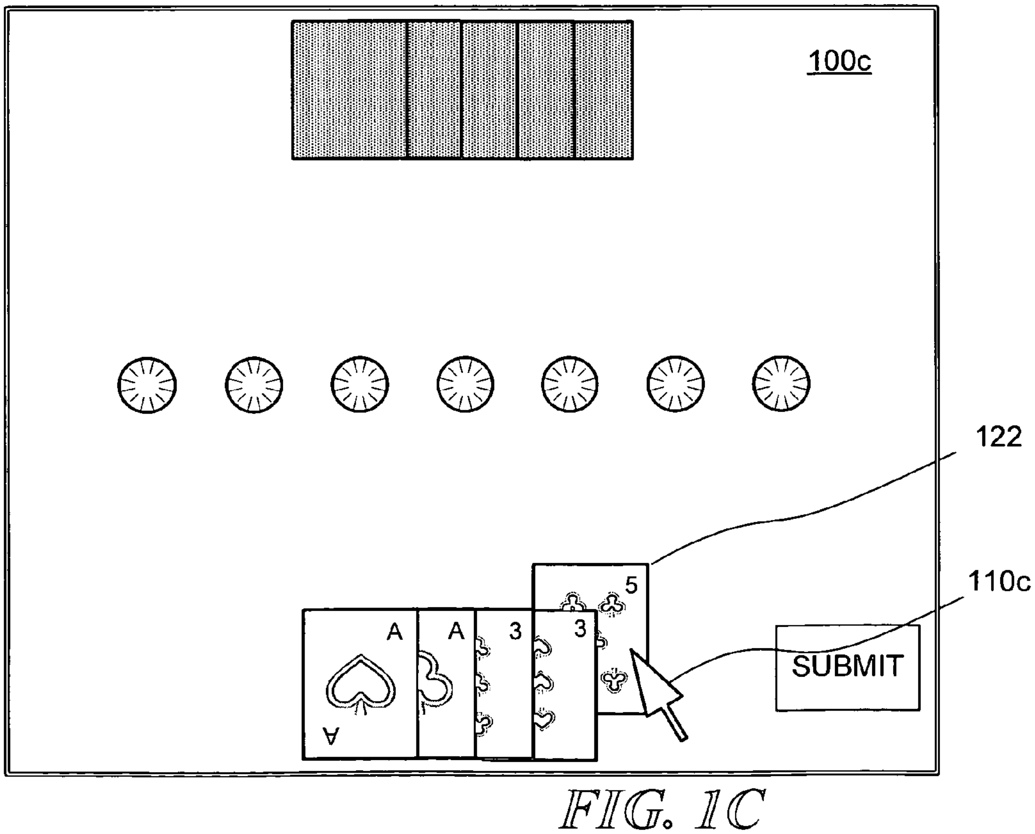
Figure 1D:
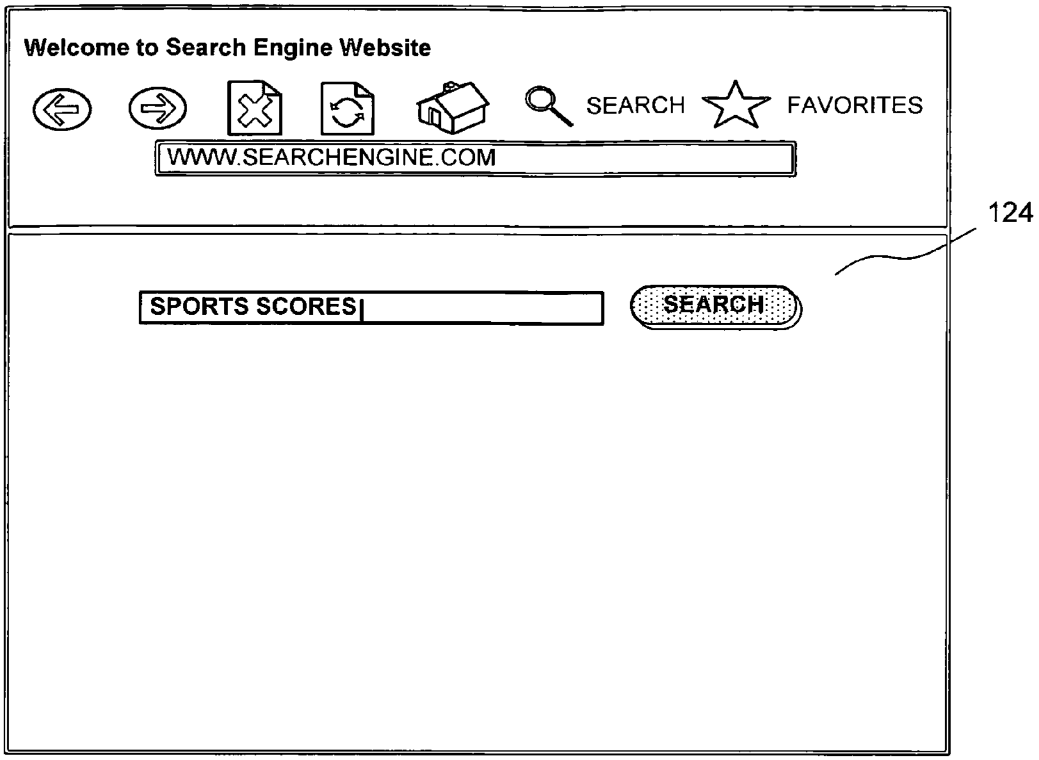
Figure 1E:
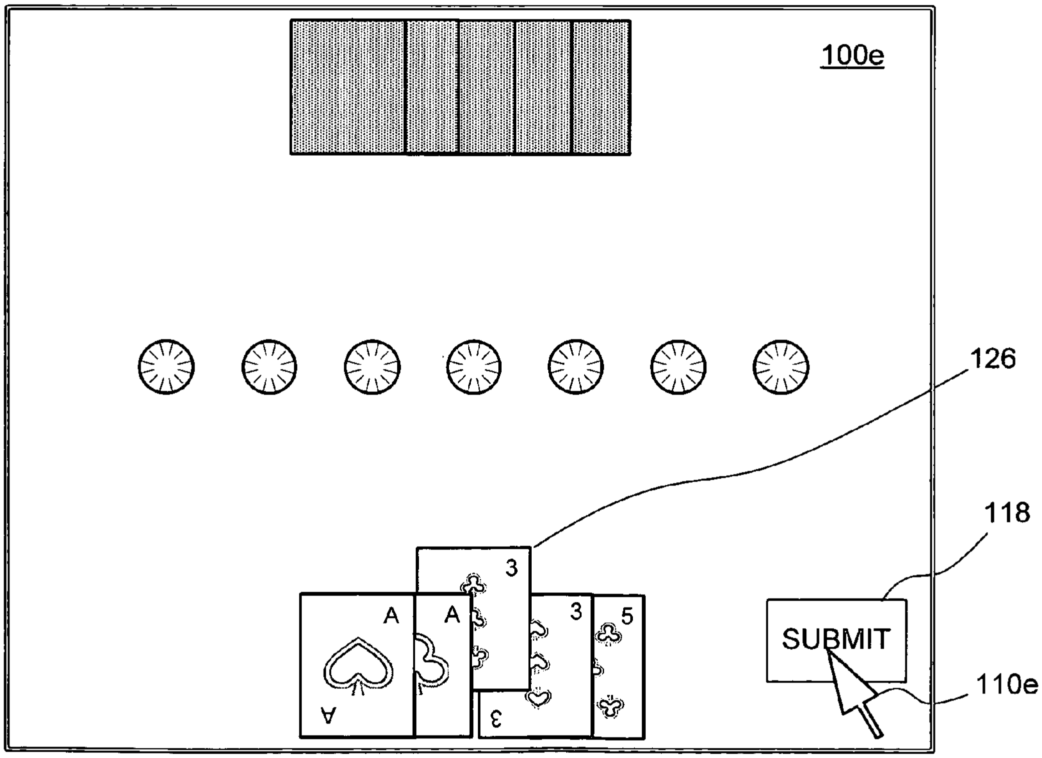
Figure 1F:
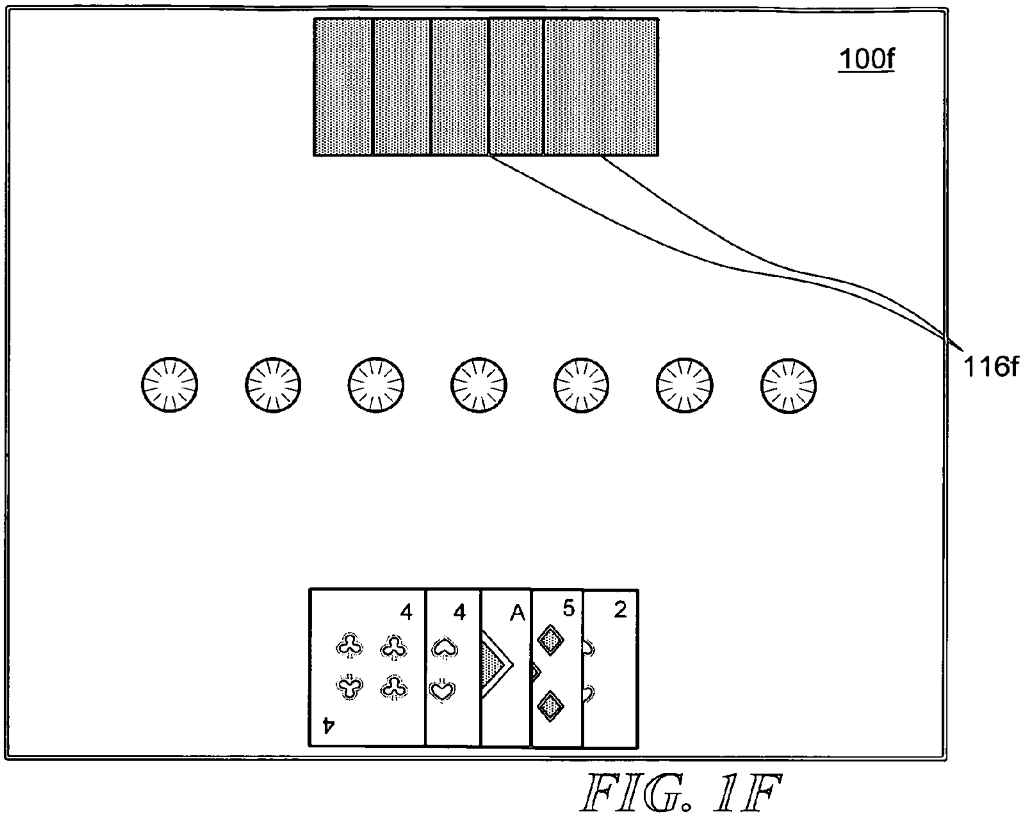
Figure 1G:
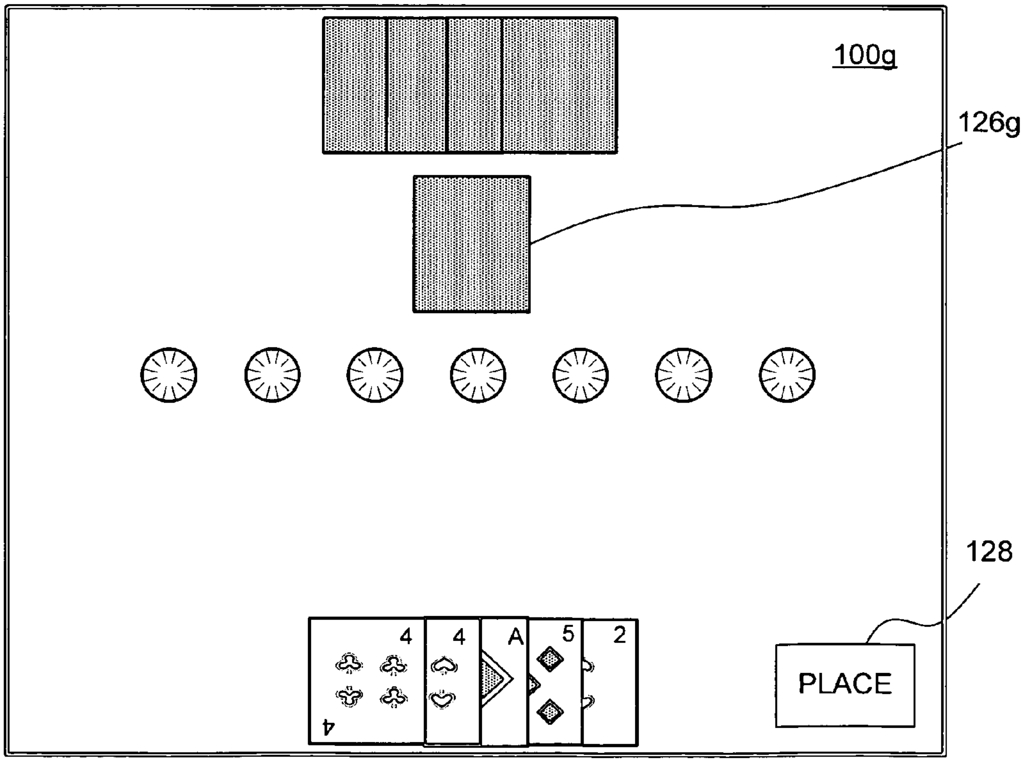

For example, as previously described in connection with FIG. 1D, a participant in an on-line card game who has become distracted, may switch to another window, such as browser window 124, during the course of the game, or may stop interacting with the on-line card game for a predefined period of time, e.g., sufficiently long for a screen saver to run. Such an action may indicate that the player is losing interest because the player may have drawn poor cards, or is simply bored or distracted. The player may not be cognizant that he/she is manifesting a lack of interest in the game. In a face-to-face game, other players would be able to see that such a player is looking around disinterestedly, but in a conventional on-line game, other players would have no idea that the player has become distracted.

Figure 8A:
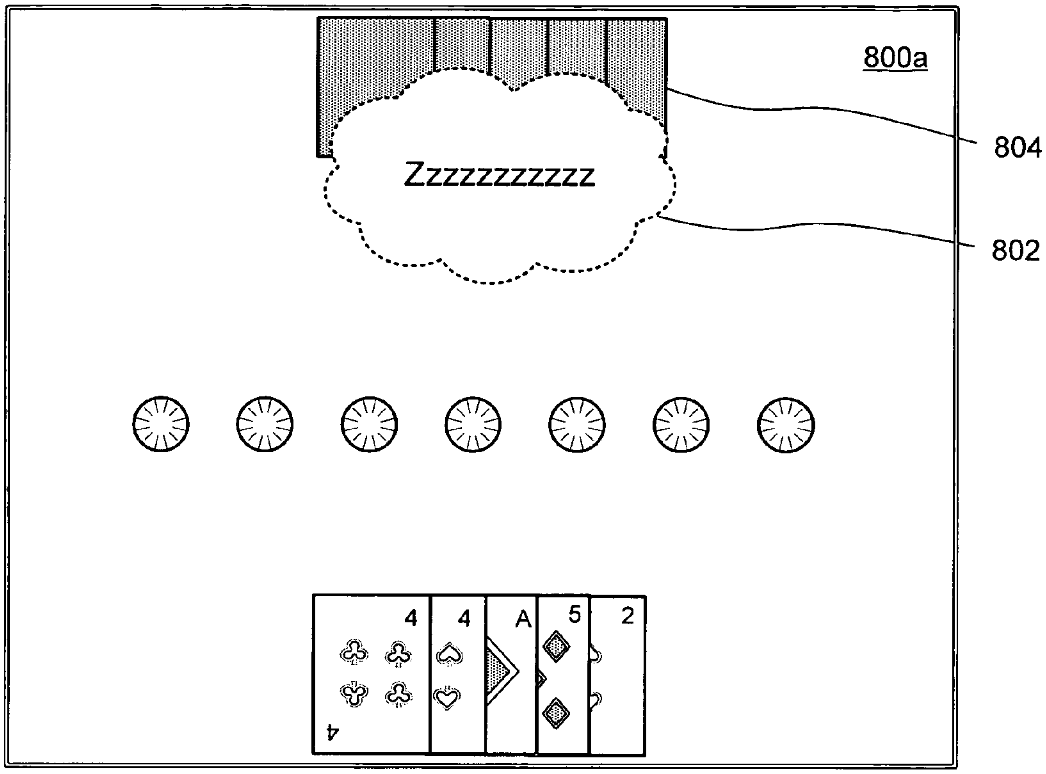
FIGS. 8A-8F show screens from an interactive computing environment in which, according to an embodiment, behavior of a first participant that may signify a "tell" is communicated to the second participant.
Figure 8B:
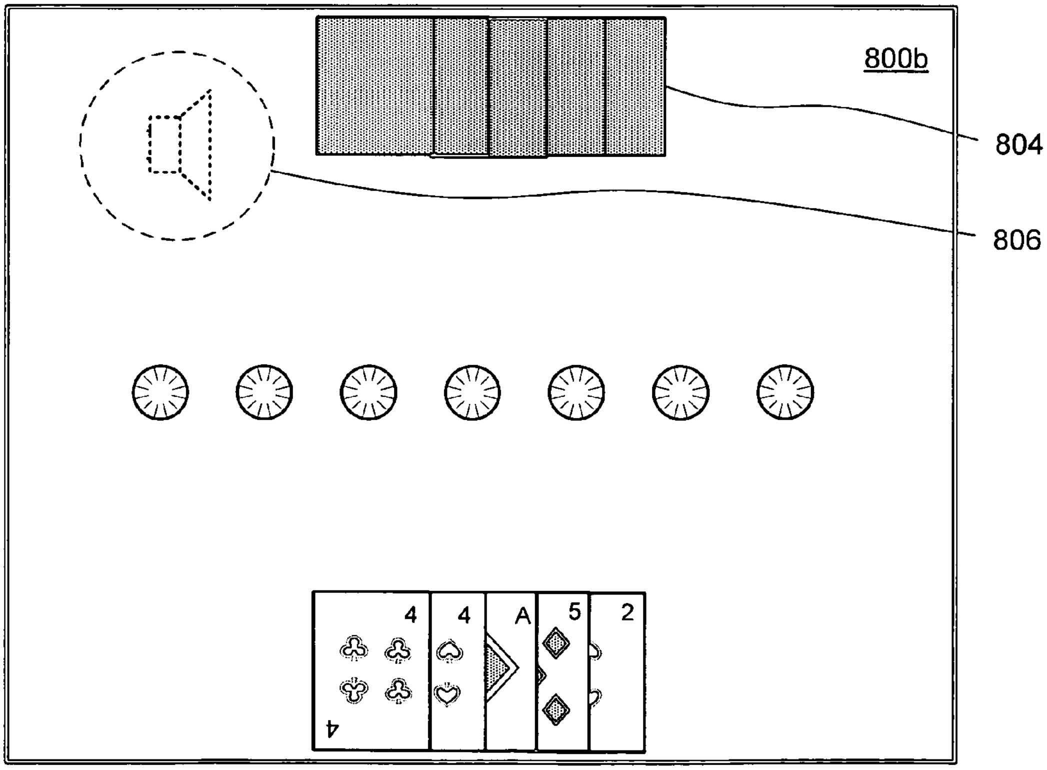

According to one embodiment, if a player opens or activates another window, this behavior can be communicated to other participants by an indicator. As shown in a screen 800*a* of FIG. 8A that represents the view of other players, a disinterest indicator 802, representative of snoring, may appear by a player's hand 804, indicating that the player has opened or activated another window. Similarly, as represented in a screen 800*b* of FIG. 8B, instead of showing a visual indicator that indicates another player has opened a browser or other window, an audible indicator 806 may be provided to other players. For example, audible indicator 806 may actually play a sound of snoring to other players to show the first player's apparent disinterest. As an alternative approach to presenting or conveying tells to a player, a haptic device such as a haptic game pad, or haptic joystick could provide the indication of another player's behavior.

Figure 8C:
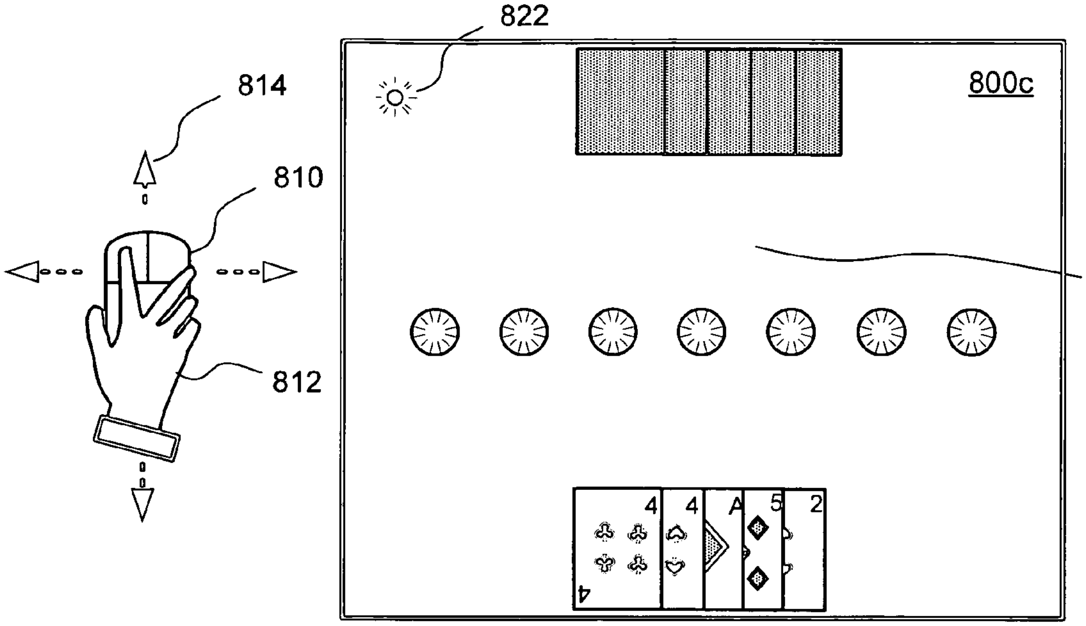
Figure 8D:
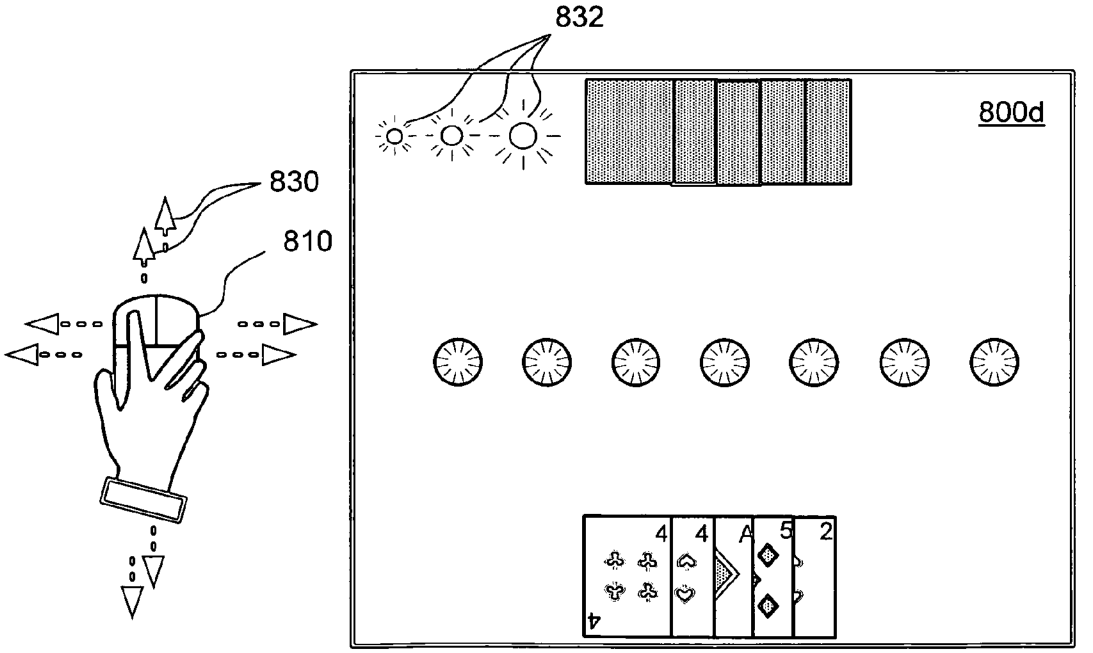

Similarly, a player who is excited or nervous may fidget with his/her hands. If a player is so fidgeting, the player may unconsciously move the mouse back and forth. Thus, as shown in screen 800*c* of FIG. 8C representing views seen by other players, if a first player starts fidgeting and thereby moves the mouse 810 with his hand 812 around the surface (not shown) where mouse 810 rests, an indicator may appear on other players' screens 800*c* showing that the player is fidgeting. If the player fidgets even more and moves mouse 810 even more animatedly, a variable indicator 832 may change to indicate the degree of movement exhibited by the first player in his interaction with the mouse. Thus, while other players may not be able to see another player twitch, drum his fingers, or otherwise manifest some atypical behavior, movements imparted to mouse 810 are presented to provide some indicia of the first player's movements that may convey a "tell." It is even contemplated that a video camera coupled with appropriate software might optically detect predefined types of behavior by a player, which could be communicated or indicated to other players, but without transmitting the video image of the player.

Figure 8E:
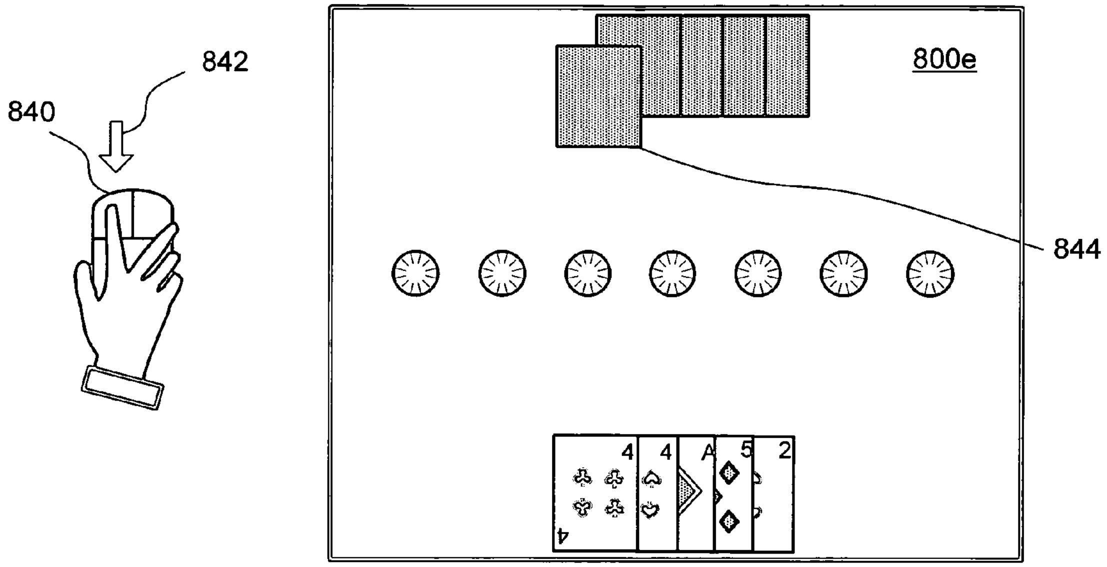
Figure 8F:
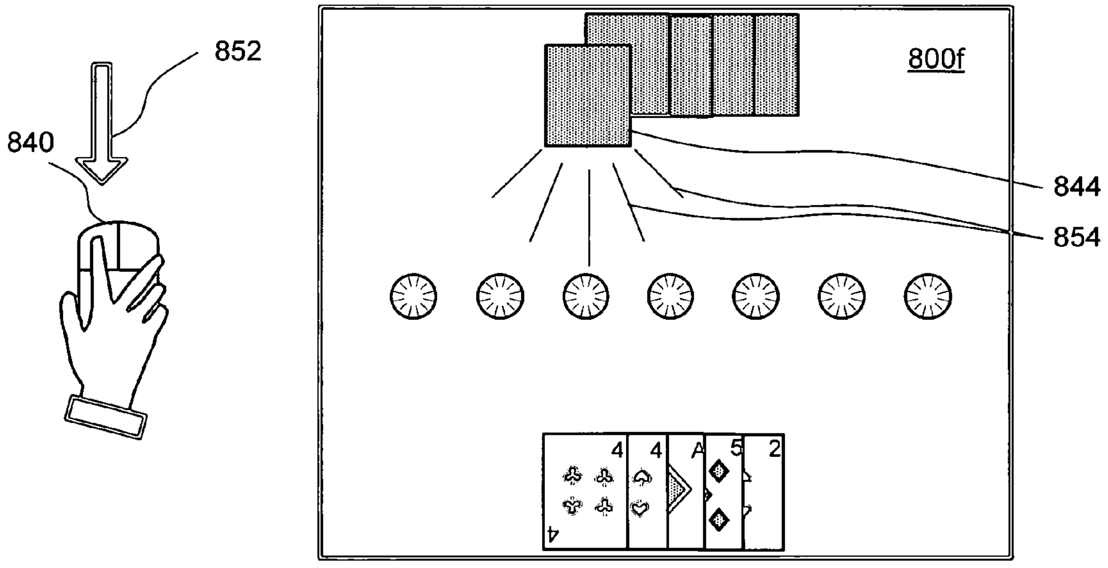

As shown in screens 800*e* and 800*f* of FIGS. 8E and 8F, respectively, other players may be shown when another player plays a card with an unusual degree of forcefulness. In a face-to-face game, players may slap card down with more force when excited or disgusted, or to make a point. As shown in screen 800*e*, if a player presses a mouse button 840 with a nominal degree of force within expected nominal parameters in playing a card 844, other players will see card 844 played, but will not be presented with additional information about the play. However, assuming mouse button 840 is able to measure a level of force imparted to actuate the mouse button, should a player press mouse button 840 with a heightened degree of force 852 beyond a predefined expected amount of force, screen 800*f* shows that a cue 854 may be associated with the playing of card 844 to signal the other players that card 844 was played with an unusual degree of force. As is the case with other visual indicators, an audible indicator also could be used to convey to other players the heightened degree of force 852 used in playing card 844.

Logical Steps for Communicating Additional Information to Other Participants

FIG. 9A is a flow diagram 900 illustrating exemplary logical steps for communicating additional information to other participants in an interactive computing environment regarding the actions of another participant. Flow diagram 900 begins at step 902. At a step 904, a participant's actions are monitored by one or more input devices associated with a computing system at which the participant engages the interactive computing environment. Examples of input devices include a keypad, a joystick, a pointing device, a keyboard, an optical sensor, a force sensor; and almost any form of a player manipulated device.

At a decision step 906, it is determined if a participant's input reflects monitored peripheral information. For example, monitored peripheral information may include a participant moving playing cards or game pieces during an online computer games, as described above. If it is determined at decision step 906 that a participant has presented input reflecting peripheral information, at a step 908, a representation indicating the manifestation of the peripheral information is presented to other participants.

If it is determined at decision step 906 that no peripheral information is detected, or that peripheral information detected has been communicated to other participants at step 908, at a decision step 910, it is determined if the participant input is indicative of monitored tells. For example, as described above, if a participant should press a mouse key with a heightened degree of force (e.g., above a predefined level), such input may register as conveying tell information. If it is determined that a participant has tells, at a step 912, representative indicators for each such tell are presented to other participants. If it is determined at decision step 910 that no tell is discerned or, after indicators representative of the telling behavior have been presented at step 912, at a decision step 914, it is determined if the interactive environment has been ended. If not, flow diagram 900 loops to step 904, where participant's actions will continue to be monitored. On the other hand, if it is determined at decision step 914 that the interactive environment has ended, exemplary flow diagram 900 ends at a step 916.

For the sake of illustration, FIG. 9B shows a flow diagram 950 representing exemplary logical steps involved in communicating peripheral information and tells for one player to other participants in an online card game. The same logic would be applied to each of the players in the online card game. Also, similar steps would be carried out for each participant, if the new development is employed in other types of online interactive environments. Flow diagram 950 begins at a step 952. At a step 954, a player's actions are monitored for manifestations of peripheral information or behavior representing one or more tells. At a decision step 956, it is determined if the player has repositioned cards in his/her hand. If so, at a step 958, the movement of the card(s) in the player's hand is shown to other players. At a decision step 960, it is determined if the player has activated another window at his/her computing system. If so, at a step 962 an inactive indicator is presented to the other players. At a decision step 964, it is determined if a player has moved his/her mouse beyond a predefined threshold amount. If so, in a step 966, an indicator representing the heightened movement is communicated to other players.

At a decision step 968, it is determined if a player has checked the value of any facedown cards. If so, at a step 970, an indicator representing the attention shown by the player to the facedown cards is provided to other players. At a decision step 972, it is determined if a player has counted his/her chips or the chips of other players. As described above, chips may be counted by directing a cursor to a representation of the chips presented on screen. If so, in a step 974, an indicator representing that the player has shown attention to the chips is presented to other players relative to the chips the player has counted.

At a decision step 976, it is determined if a card has been selected by a player. If so, at a step 978 the card the player has selected in his hand is indicated to other players. At a decision step 980, it is determined if a card has been played. In other games, the selection of another type of object, such a graphic object, without completing an action related to the object may be conveyed to the other players. If not, flow diagram 950 loops to step 954 to continue monitoring the player's actions to detect behaviors that may represent peripheral information or tells. On the other hand, if it is determined at decision step 980 that a card has been played, at a decision step 982, it is determined if the card has been played with more than a predefined threshold amount of force. If so, at a step 984, the use of heightened force (or the amount of heightened force) with which the card was played is indicated to other players.

If it is determined at decision step 982 that no unusual amount of force has been used, or after the use of heightened degree force has been communicated to other players, at a decision step 986, it is determined if the game has ended. If not, flow diagram 950 loops to step 954 to continue monitoring the player's actions. On the other hand, if it is determined at decision step 986 that the game has ended, flow diagram 950 ends at a step 988.

Although not discussed above, it is contemplated that any one or more of the participants in an interactive environment might be a computer-simulated participant, rather than an actual human participant. Further, to add to the interest in a game or other interactive environment using such a computer simulated participant, the computer could be programmed to either manifest an additional behavior to provide information or tells to the human participants, just as described above. The additional behavior might be either randomly determined or based upon a defined rule set corresponding to one or more parameters in the interactive environment.

Exemplary Computing System for Implementing this Functionality

With reference to FIG. 10, an exemplary system suitable for implementing the functionality described above is shown. The exemplary system of FIG. 10 includes a general purpose computing device in the form of a conventional PC 1020, provided with a processing unit 1021, a system memory 1022, and a system bus 1023. The system bus couples various system components including the system memory to processing unit 1021 and may be any of several types of bus structures, including a memory bus or memory controller, a peripheral bus, and a local bus using any of a variety of bus architectures. The system memory includes read only memory (ROM) 1024 and random access memory (RAM) 1025. A basic input/output system 1026 (BIOS), containing the basic routines that help to transfer information between elements within the PC 1020, such as during start up, is stored in ROM 1024. PC 1020 flurther includes a hard disk drive 1027 for reading from and writing to a hard disk (not shown), a magnetic disk drive 1028 for reading from or writing to a removable magnetic disk 1029, and an optical disk drive 1030 for reading from or writing to a removable optical disk 1031, such as a compact disk-read only memory (CD-ROM) or other optical media. Hard disk drive 1027, magnetic disk drive 1028, and optical disk drive 1030 are connected to system bus 1023 by a hard disk drive interface 1032, a magnetic disk drive interface 1033, and an optical disk drive interface 1034, respectively. The drives and their associated computer readable media provide nonvolatile storage of computer readable machine instructions, data structures, program modules, and other data for PC 1020. Although the exemplary environment described herein employs a hard disk, removable magnetic disk 1029, and removable optical disk 1031, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 1029, optical disk 1031, ROM 1024, or RAM 1025, including an operating system 1035, one or more application programs 1036, other program modules 1037, and program data 1038. A user may enter commands and information in PC 1020 and provide control input through input devices, such as a keyboard 1040 and a pointing device 1042. Pointing device 1042 may include a mouse, stylus, wireless remote control, or other pointer. As used hereinafter, the term "mouse" is intended to encompass virtually any pointing device that is useful for controlling the position of a cursor on the screen. Other input devices (not shown) may include, for example, a microphone, joystick, haptic joystick, yoke, foot pedals, game pad, game controller, voice command hardware, gesture command through video camera detection, eye movement detection hardware, satellite dish, scanner, and almost any other form of user manipulated input device, or the like. Also, PC 1020 may include a Bluetooth radio or other wireless interface for communication with various types of interface device, such as printers, or the interactive display table of the new development. These and other input/output (I/O) devices are often connected to processing unit 1021 through an I/O interface 1046 that is coupled to the system bus 1023. The term I/O interface is intended to encompass each interface specifically used for a serial port, a parallel port, a game port, a keyboard port, and/or a universal serial bus (USB). A monitor 1047 can be connected to system bus 1023 via an appropriate interface, such as a video adapter 1048. It will be appreciated that PCs are often coupled to other peripheral output devices (not shown), such as speakers (through a sound card or other audio interface—not shown) and printers.

The new development may be practiced on a single machine, although PC 1020 would provide interactive functionality with other participants by operating in a networked environment using logical connections to one or more remote computers, such as a remote computer 1049. Remote computer 1049 may be, for example, another PC, a server (which is typically generally configured much like PC 1020), a game console, a PDA, a mobile phone, a router, a network PC, a peer device, or a satellite or other common network node, and typically includes many or all of the elements described above in connection with PC 1020, although only an external memory storage device 1050 has been illustrated in FIG. 10. The logical connections depicted in FIG. 10 include a local area network (LAN) 1051 and a wide area network (WAN) 1052, either of which might be public (like the Internet), or private, like Microsoft Corporation's XBOX LIVE™ network. Such networking environments are common in offices, enterprise wide computer networks, intranets, and as noted, may include the Internet.

When used in a LAN networking environment, PC 1020 is connected to LAN 1051 through a network interface or adapter 1053. When used in a WAN networking environment, PC 1020 typically includes a modem 1054, or other means such as a cable modem, Digital Subscriber Line (DSL) interface, or an Integrated Service Digital Network (ISDN) interface for establishing communications with other computing devices over WAN 1052, such as the Internet. Modem 1054, which may be internal or external, is connected to the system bus 1023 or coupled to the bus via I/O device interface 1046, i.e., through a serial port. In a networked environment, program modules, or portions thereof, used by PC 1020 may be stored in the remote memory storage device. It will be appreciated that the network connections shown are exemplary and other means of establishing a communications link between the computers may be used, such as wireless communication and wide band network links.

Although the new development has been described in connection with the preferred form of practicing it and modifications thereto, those of ordinary skill in the art will understand that many other modifications can be made to the new development within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for representing at least one additional behavior of a first participant to a second participant in an interactive computer environment during play of an electronic game, where the first participant is interacting using a first computing system coupled in communication with a second computing system that is being used for the interactive computer environment by the second participant, comprising the steps of:

(a) specifying at least one additional behavior that is not dictated by rules of the interactive computer environment;

(b) associating an indicator with the at least one additional behavior;

(c) the first computing system monitoring actions of the first participant to detect an occurrence of the at least one additional behavior by the first participant corresponding with a user interaction with a first at least one displayed game piece of an electronic game in a manner that does not complete a turn or a move in the electronic game, wherein the user interaction with the first at least one displayed game piece comprises one or more of reordering the first at least one displayed game piece, selecting the first at least one displayed game piece in a manner that does not complete a turn or a move, or positioning an input cursor over the first at least one displayed game piece in excess of a predefined period of time;

(d) after detecting the occurrence of the user interaction with the first at least one displayed game piece by the first participant, the first computing system sending a signal to the second computing system, which is in a remote location from the first computing system, and signifying the occurrence of the at least one additional behavior; and (e) wherein the signal causes the second computing system to display an indicator on the second computing system proximate a second at least one displayed game piece that corresponds to the first at least one displayed game piece to reflect the user interaction with the first at least one displayed game piece at the first computing system.

2. The method of claim 1, wherein the interactive computer environment comprises an electronic game in which a mandated interactive behavior by participants playing the game is dictated by the rules of the game, so that the at least one additional behavior is not a required interactive behavior.

3. The method of claim 2, wherein the at least one additional behavior further includes one of:

(a) manipulating an input device in a manner not intentionally directed to effecting a displayed game piece;

(b) activating a control with a degree of force that exceeds a predefined level, when initiating a mandated interactive behavior;

(c) interacting with a window presented by the first computing system, other than a window in which the interactive computer environment is presented; and (d) not interacting with the computing system for at least a predefined time.

4. The method of claim 3, wherein the indicator includes at least one of a visual indicator, a haptic indicator, and an audible indicator.

5. The method of claim 4, wherein the visual indicator includes at least one of:

(a) repositioning the second at least one displayed game piece on the second computing system by manipulating the second at least one displayed game piece on the second computing system in a manner that does not complete one of the turn and the move;

(b) a movement indicator representing an extent of movement of the input device that is not intentionally directed to effecting the first at least one displayed game piece;

(c) a force indicator representing a degree of force with which the first participant activates the control in initiating a behavior that is mandated; and (d) an idle indicator, indicating one of:

(i) that the first participant is interacting with the window presented by the first computing system other than the widow in which the interactive computer environment is presented; and (ii) that the first participant has not interacted with the first computing system for more than the predefined period of time.

6. The method of claim 3, wherein the electronic game comprises a card game involving a plurality of displayed game pieces, including at least one of playing cards and chips, and wherein the additional behavior includes at least one of:

(a) moving a playing card from one position to another position in a hand of playing cards controlled by the first participant;

(b) viewing a face of a playing card previously laid face down by the first participant; and (c) scrutinizing a number of chips that are one of:

(i) available to at least one participant in the game;

(ii) in front of at least one participant in the game; and (iii) provided by at least participant in a shared bet.

7. The method of claim 3, wherein the electronic game includes at least one of a plurality of playing pieces and a plurality of objects, and the additional behavior includes at least one of:

(a) manipulating an input device for purposes of selecting a piece for a potential move;

(b) directing the playing piece selected from a current position to a new position as part of the potential move;

(c) directing the playing piece selected back to a current position without completing the turn or the move; and (d) selecting one of the plurality of objects without completing an action related to the one object that was selected.

8. The method of claim 1, wherein monitoring actions includes the step of monitoring and interaction of the first participant with an input device comprising at least one of:

(a) a keypad;

(b) a joystick;

(c) a pointing device;

(d) a keyboard;

(e) an optical sensor;

(f) a force sensor; and (g) a player manipulated device.

9. The method of claim 1, wherein in response to detecting the reordering of the first at least one displayed game piece, an indicator comprising an arrow which indicates the new position of the at least one displayed game piece is displayed proximate the second at least one displayed game piece.

10. The method of claim 1, wherein in response to detecting the selection of the first at least one displayed game piece in a manner that does not complete a turn or a move, the indicator comprises one or more of displacing the second at least one game piece, or displaying an eye or hand icon proximate the second at least one game piece.

11. The method of claim 10, further comprising modifying the color or intensity of the eye icon to indicate the duration of the selection of the first at least one displayed game piece.

12. A memory media on which are stored machine instructions for communicating to a second player that a first player in a computer game has performed at least one additional behavior, the machine instructions causing the following functions when executed by a processor of a first computing system being used by a first player for participating in the computer game:

(a) specifying at least one additional behavior that is not a mandated behavior dictated by rules of the game to complete a turn or a move;

(b) associating an indicator with the at least one additional behavior;

(c) monitoring actions of the first player to detect an occurrence of the at least one additional behavior by the first player and that at least includes a user interaction with a first at least one displayed game piece of an electronic game in a manner that does not complete a turn or a move in the electronic game, wherein the user interaction with the first at least one displayed game piece comprises one or more of reordering the first at least one displayed game piece, selecting the first at least one displayed game piece in a manner that does not complete a turn or a move, or positioning an input cursor over the first at least one displayed game piece in excess of a predefined period of time;

(d) after detecting the occurrence of the user interaction with the first at least one displayed game piece by the first player, transmitting a signal to a second computing system being used by a second player for participating in the computer game, the second computing system being in a remote location from the first player, and the signal causing the second computing system to display an indicator at the second computing system proximate a second at least one displayed game piece corresponding to the first at least one displayed game piece to reflect the user interaction with the first at least one displayed game piece at the first computing system.

13. The memory media of claim 12, wherein the at least one additional behavior further comprises at least one of:

(a) moving an input device in a manner not specifically directed to manipulating a displayed game piece in the computer game;

(b) activating an input control with a force greater than a predefined threshold to initiate a mandated behavior in the computer game; and (c) interacting with a displayed object that is not included in the computer game.

14. The memory media of claim 12, wherein the indicator includes at least one of:

(a) indicating movement of the first at least one displayed game piece in a manner that does not complete a turn or a move in the computer game;

(b) a movement indicator representing a degree of movement of an input device, where the movement is not directed to manipulating the first at least one displayed game piece in the computer game;

(c) a force indicator representing that an excessive force was applied by the first player in activating a control on the input device for initiating a mandated behavior in the computer game; and (d) an idle indicator indicating when the first player is interacting with an object that is not included in the computer game.

15. The memory media of claim 12, wherein the computer game comprises a card game involving a plurality of displayed game pieces including at least one of playing cards and chips, and the additional behavior of the first player includes at least one of:

(a) moving a playing card from one position to another position in a hand of playing cards controlled by the first participant;

(b) viewing a face of a playing card previously laid face down by the first participant; and (c) scrutinizing a number of chips that are one of:

(i) available to at least one participant in the game;

(ii) in front of at least one participant in the game; and (iii) provided by at least participant in a shared bet.

16. The memory media of claim 12, wherein the computer game includes at least one of a plurality of playing pieces and a plurality of objects, and the additional behavior includes at least one of:

(a) manipulating an input device for purposes of selecting a piece for a potential move;

(b) directing the playing piece selected from a current position to a new position as part of the potential move;

(c) directing the playing piece selected back to a current position without completing the turn or the move; and (d) selecting one of the plurality of objects without completing an action related to the one object that was selected.

17. The memory media of claim 12, wherein the additional behavior is detected by an interaction of the first player with at least one of:

(a) a keypad;

(b) a joystick;

(c) a pointing device;

(d) a keyboard;

(e) an optical sensor;

(f) a force sensor; and (g) a player manipulated device.

18. The memory media of claim 12, wherein the first player is a computer-simulated player in accord with the machine instructions, and the machine instructions, when executed by the processor used by the first player cause the processor to manifest the at least one additional behavior.

19. The memory media of claim 12, wherein the at least one additional behavior provides at least one of:

(a) peripheral information corresponding to at least one conscious action of the first player beyond the behavior mandated by the rules of the computer game to complete a turn or a move; and (b) tell information corresponding to at least one action of which the first player may not be conscious, but which represents a potential correlation with a thought process of the first player.

20. A system for communicating that at least one additional behavior was carried out by a participant in an interactive computer environment, to at least one other participant in the interactive computer environment, comprising:

(a) at least one user input device;

(b) a display operable to present visual content on a display screen;

(c) a network interface operable to communicate with at least one additional computing system over a network;

(d) a processor in communication with the at least one input device, the display, and the network interface; and (e) a memory in communication with the processor, the memory storing data and machine instructions that cause the processor to carry out a plurality of functions, including:

(i) detecting at least one additional behavior that is not dictated by rules of the interactive computer environment and that includes a user interaction with a first at least one displayed game piece of an electronic game in a manner that does not complete a turn or a move in the electronic game, wherein the user interaction with the first at least one displayed game piece comprises one or more of reordering the first at least one displayed game piece, selecting the first at least one displayed game piece in a manner that does not complete a turn or a move, or positioning an input cursor over the first at least one displayed game piece in excess of a predefined period of time;

(ii) associating an indicator with the at least one additional behavior;

(iii) monitoring the at least one user input device to detect an occurrence of at least one additional behavior as a result of actions of the participant; and (iv) after detecting the user interaction with the first at least one displayed game piece, transmitting a signal through the network interface over a network to the at least one additional computing system, which is remote from the first computing system, signifying the occurrence of the at least one additional behavior and that causes the at least one additional computing system to display an indicator proximate a second at least one displayed game piece corresponding with the first at least one displayed game piece to reflect the user interaction with the first at least one displayed game piece at the first computing system.

21. The system of claim 20, wherein the plurality of functions carried out by the processor further include:

(a) receiving a signal through the network interface from the at least one additional computing system indicating that another participant in the interactive computer environment has performed an additional behavior that is not dictated by rules of the interactive computer environment; and (b) responding to the signal received from the at least one additional computing system by providing an indication on the display corresponding to the additional behavior performed by the other participant.

* * * * *